US008914743B2

(12) United States Patent
Nakajima et al.

(10) Patent No.: US 8,914,743 B2
(45) Date of Patent: Dec. 16, 2014

(54) DEVICE, METHOD, AND GRAPHICAL USER INTERFACE FOR NAVIGATING A LIST OF IDENTIFIERS

(75) Inventors: Taido L. Nakajima, Cupertino, CA (US); Policarpo Bonilla Wood, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 639 days.

(21) Appl. No.: 13/076,416

(22) Filed: Mar. 30, 2011

(65) Prior Publication Data

US 2012/0124469 A1 May 17, 2012

Related U.S. Application Data

(60) Provisional application No. 61/413,381, filed on Nov. 12, 2010.

(51) Int. Cl.
*G06F 3/0482* (2013.01)
*G06F 3/0481* (2013.01)
*G06F 3/0488* (2013.01)
*G06F 3/0485* (2013.01)

(52) U.S. Cl.
CPC .......... *G06F 3/0482* (2013.01); *G06F 3/04817* (2013.01); *G06F 3/0488* (2013.01); *G06F 3/0485* (2013.01)
USPC ........... 715/786; 715/703; 715/739; 715/787; 715/810; 715/833; 715/835

(58) Field of Classification Search
CPC .. G06F 3/0482; G06F 3/04855; G06F 9/4448
USPC ...................................................... 715/786
See application file for complete search history.

(56) References Cited

U.S. PATENT DOCUMENTS

| 5,148,541 | A | | 9/1992 | Lee et al. |
| 5,974,372 | A | | 10/1999 | Barnes et al. |
| 6,073,036 | A | * | 6/2000 | Heikkinen et al. ......... 455/550.1 |

(Continued)

FOREIGN PATENT DOCUMENTS

EP 1 901 184 A1 3/2008

OTHER PUBLICATIONS

International Search Report and Written Opinion dated Feb. 28, 2012, received in International Patent Application No. PCT/US2011/060296, which corresponds to U.S. Appl. No. 13/076,416, 9 pages (Nakajima).

(Continued)

*Primary Examiner* — Alvin Tan
(74) *Attorney, Agent, or Firm* — Morrison & Foerster LLP

(57) ABSTRACT

An electronic device with a display and a touch-sensitive surface displays a portion of a list of identifiers. The list of identifiers are associated with: a first number of first content items associated with a first language, and a second number of second content items associated with a second language. The device concurrently displays a character selection element that includes: a first sub-element associated with the first content items and having a first size, and a second sub-element associated with the second content items and having a second size, the first size relative to the second size being based on the first number relative to the second number. In response to detecting an input on the second sub-element, the device displays a portion of the list of identifiers with identifiers associated with second content items.

24 Claims, 27 Drawing Sheets

(56) References Cited

U.S. PATENT DOCUMENTS

| | | | |
|---|---|---|---|
| 6,396,515 | B1 | 5/2002 | Hetherington et al. |
| 6,826,728 | B1* | 11/2004 | Horiyama ..................... 715/210 |
| 7,676,757 | B2 | 3/2010 | Awada et al. |
| 7,702,632 | B2* | 4/2010 | Koori ..................... 707/999.007 |
| 8,412,278 | B2* | 4/2013 | Shin et al. ..................... 455/566 |
| 2002/0040866 | A1* | 4/2002 | Tuneld et al. ................. 209/546 |
| 2003/0128192 | A1* | 7/2003 | van Os ........................... 345/173 |
| 2004/0160419 | A1* | 8/2004 | Padgitt ........................... 345/173 |
| 2005/0012723 | A1* | 1/2005 | Pallakoff ........................ 345/173 |
| 2005/0210403 | A1* | 9/2005 | Satanek ......................... 715/786 |
| 2007/0100890 | A1 | 5/2007 | Kim |
| 2007/0124675 | A1 | 5/2007 | Ban et al. |
| 2007/0129112 | A1* | 6/2007 | Tarn .............................. 455/566 |
| 2007/0132789 | A1 | 6/2007 | Ording et al. |
| 2007/0247436 | A1 | 10/2007 | Jacobsen |
| 2008/0168361 | A1 | 7/2008 | Forstall et al. |
| 2008/0294424 | A1* | 11/2008 | Naito et al. ....................... 704/8 |
| 2009/0024538 | A1* | 1/2009 | Joo .............................. 705/36 R |
| 2009/0075694 | A1 | 3/2009 | Kim et al. |
| 2009/0234632 | A1 | 9/2009 | Hasegawa et al. |

OTHER PUBLICATIONS

International Preliminary Report on Patentability dated May 23, 2013, received in International Application No. PCT/US2011/060296, which corresponds to U.S. Appl. No. 13/076,416, 7 pages (Nakajima).

\* cited by examiner

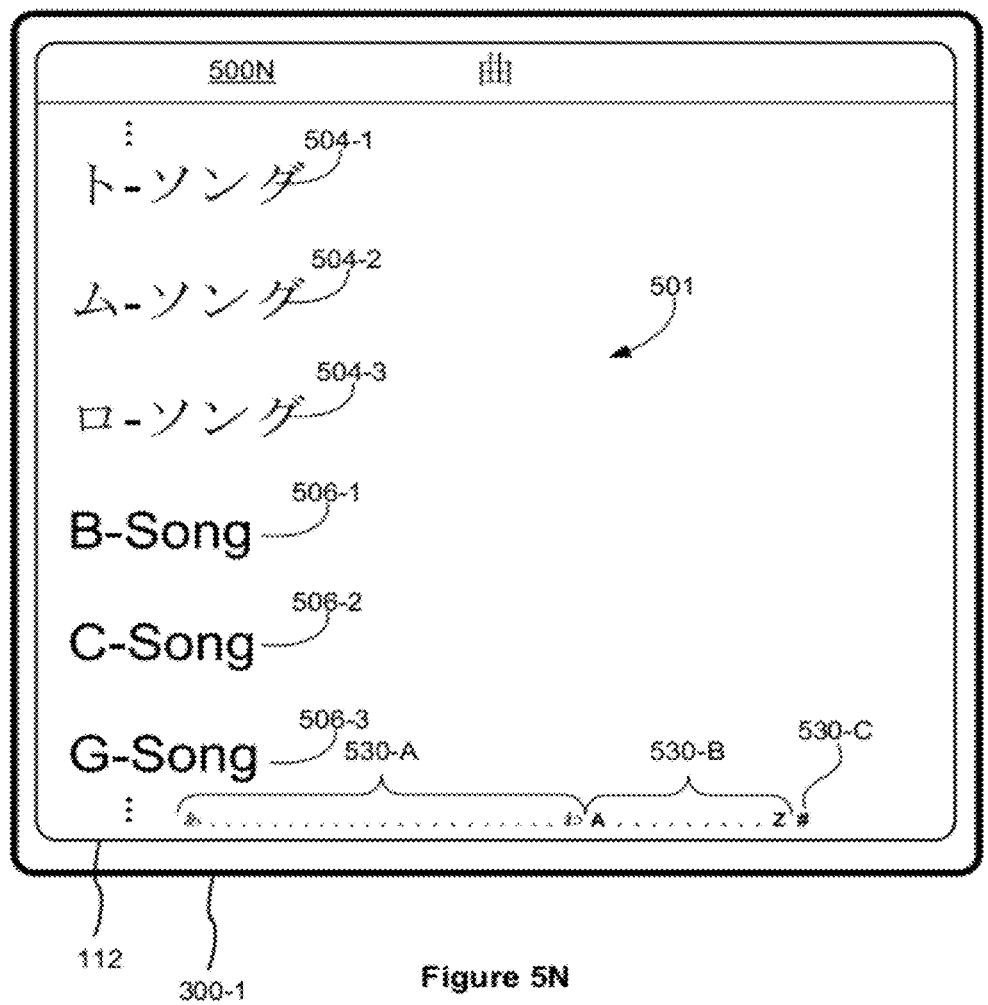

DEVICE, METHOD, AND GRAPHICAL USER INTERFACE FOR NAVIGATING A LIST OF IDENTIFIERS

RELATED APPLICATIONS

This application claims priority to U.S. Provisional Application Ser. No. 61/413,381, filed Nov. 12, 2010, entitled "Device, Method, and Graphical User Interface for Navigating a List of Identifiers," which is incorporated herein by reference in its entirety.

TECHNICAL FIELD

This relates generally to electronic devices with displays and touch-sensitive surfaces, including but not limited to electronic devices that include a list navigation index bar.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include navigating through lists to find a desired piece of content. For example, in a digital content player (e.g., a portable music and/or video player), a user may need to navigate through lists of artists, albums, authors, composers, compilations, or titles (e.g., song titles) to find a desired piece of content. In many cases, the user needs to search through artists, albums, authors, composers, compilations, or titles in multiple languages. For example, a Japanese user may have Japanese content identified in Japanese and English content identified in English; a Chinese user may have Chinese content identified in Chinese, Japanese content identified in Japanese, and English content identified in English; and so on.

But existing methods for navigating through lists are cumbersome and inefficient, particularly when the list contains identifiers for content in more than one language. Navigating through lists with multiple languages is tedious and creates a significant cognitive burden on a user. In addition, existing navigation methods take longer than necessary, thereby wasting energy. This latter consideration is particularly important in battery-operated devices.

SUMMARY

Accordingly, there is a need for electronic devices with faster, more efficient methods and interfaces for navigating a list of identifiers for content in more than one language. Such methods and interfaces may complement or replace conventional methods for navigating a list of identifiers. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying on the display: a portion of a list of identifiers, the list of identifiers associated with: a first number of first content items associated with a first language, and a second number of second content items, distinct from the first content items, associated with a second language distinct from the first language; and, a character selection element for navigating the list of identifiers, the character selection element representing a plurality of characters, the character selection element including: a first character selection sub-element associated with the first content items and having a first size, and a second character selection sub-element associated with the second content items and having a second size, the first size relative to the second size being based on the first number relative to the second number. The one or more programs also include instructions for detecting an input at a location on the touch-sensitive surface that corresponds to a location on the first character selection sub-element on the display; in response to detecting the input at the location on the touch-sensitive surface that corresponds to the location on the first character selection sub-element on the display, displaying a portion of the list of identifiers with one or more identifiers associated with first content items; detecting an input at a location on the touch-sensitive surface that corresponds to a location on the second character selection sub-element on the display; and, in response to detecting the input at the location on the touch-sensitive surface that corresponds to the location on the second character selection sub-element on the display, displaying a portion of the list of identifiers with one or more identifiers associated with second content items.

In accordance with some embodiments, a method is performed at an electronic device with a display and a touch-sensitive surface. The method includes: displaying on the display: a portion of a list of identifiers, the list of identifiers associated with: a first number of first content items associated with a first language, and a second number of second content items, distinct from the first content items, associated with a second language distinct from the first language; and, a character selection element for navigating the list of identifiers, the character selection element representing a plurality of characters, the character selection element including: a first character selection sub-element associated with the first content items and having a first size, and a second character selection sub-element associated with the second content items and having a second size, the first size relative to the second size being based on the first number relative to the second number. The method also includes detecting an input at a location on the touch-sensitive surface that corresponds to a location on the first character selection sub-element on the display; in response to detecting the input at the location on the touch-sensitive surface that corresponds to the location on the first character selection sub-element on the display, displaying a portion of the list of identifiers with one or more identifiers associated with first content items; detecting an input at a location on the touch-sensitive surface that corresponds to a location on the second character selection sub-element on the display; and, in response to detecting the input at the location on the touch-sensitive surface that corresponds to the location on the second character selection sub-element on the display, displaying a portion of the list of identifiers with one or more identifiers associated with second content items.

In accordance with some embodiments, a graphical user interface on an electronic device with a display, a touch-sensitive surface, a memory, and one or more processors to execute one or more programs stored in the memory includes: a portion of a list of identifiers, the list of identifiers associated with: a first number of first content items associated with a first language, and a second number of second content items, distinct from the first content items, associated with a second language distinct from the first language; and, a character selection element for navigating the list of identifiers, the character selection element representing a plurality of characters, the character selection element including: a first character selection sub-element associated with the first content items and having a first size, and a second character selection sub-element associated with the second content items and having a second size, the first size relative to the second size being based on the first number relative to the second number. An input is detected at a location on the touch-sensitive surface that corresponds to a location on the first character selection sub-element on the display. In response to detecting the input at the location on the touch-sensitive surface that corresponds to the location on the first character selection sub-element on the display, a portion of the list of identifiers with one or more identifiers associated with first content items is displayed. An input is detected at a location on the touch-sensitive surface that corresponds to a location on the second character selection sub-element on the display. In response to detecting the input at the location on the touch-sensitive surface that corresponds to the location on the second character selection sub-element on the display, a portion of the list of identifiers with one or more identifiers associated with second content items is displayed.

In accordance with some embodiments, a non-transitory computer readable storage medium has stored therein instructions which when executed by an electronic device with a display and a touch-sensitive surface, cause the device to: display on the display: a portion of a list of identifiers, the list of identifiers associated with: a first number of first content items associated with a first language, and a second number of second content items, distinct from the first content items, associated with a second language distinct from the first language; and, a character selection element for navigating the list of identifiers, the character selection element representing a plurality of characters, the character selection element including: a first character selection sub-element associated with the first content items and having a first size, and a second character selection sub-element associated with the second content items and having a second size, the first size relative to the second size being based on the first number relative to the second number. The computer readable storage medium has also stored therein instructions which when executed by an electronic device with a display and a touch-sensitive surface, cause the device to: detect an input at a location on the touch-sensitive surface that corresponds to a location on the first character selection sub-element on the display; in response to detecting the input at the location on the touch-sensitive surface that corresponds to the location on the first character selection sub-element on the display, display a portion of the list of identifiers with one or more identifiers associated with first content items; detect an input at a location on the touch-sensitive surface that corresponds to a location on the second character selection sub-element on the display; and, in response to detecting the input at the location on the touch-sensitive surface that corresponds to the location on the second character selection sub-element on the display, display a portion of the list of identifiers with one or more identifiers associated with second content items.

In accordance with some embodiments, an electronic device includes: a display; a touch-sensitive surface; means for displaying on the display: a portion of a list of identifiers, the list of identifiers associated with: a first number of first content items associated with a first language, and a second number of second content items, distinct from the first content items, associated with a second language distinct from the first language; and, a character selection element for navigating the list of identifiers, the character selection element representing a plurality of characters, the character selection element including: a first character selection sub-element associated with the first content items and having a first size, and a second character selection sub-element associated with the second content items and having a second size, the first size relative to the second size being based on the first number relative to the second number; means for detecting an input at a location on the touch-sensitive surface that corresponds to a location on the first character selection sub-element on the display; in response to detecting the input at the location on the touch-sensitive surface that corresponds to the location on the first character selection sub-element on the display, means for displaying a portion of the list of identifiers with one or more identifiers associated with first content items; means for detecting an input at a location on the touch-sensitive surface that corresponds to a location on the second character selection sub-element on the display; and, in response to detecting the input at the location on the touch-sensitive surface that corresponds to the location on the second character selection sub-element on the display, means for displaying a portion of the list of identifiers with one or more identifiers associated with second content items.

In accordance with some embodiments, an information processing apparatus for use in an electronic device with a display and a touch-sensitive surface includes: means for displaying on the display: a portion of a list of identifiers, the list of identifiers associated with: a first number of first content items associated with a first language, and a second number of second content items, distinct from the first content items, associated with a second language distinct from the first language; and, a character selection element for navigating the list of identifiers, the character selection element representing a plurality of characters, the character selection element including: a first character selection sub-element associated with the first content items and having a first size, and a second character selection sub-element associated with the second content items and having a second size, the first size relative to the second size being based on the first number relative to the second number; means for detecting an input at a location on the touch-sensitive surface that corresponds to a location on the first character selection sub-element on the display; in response to detecting the input at the location on the touch-sensitive surface that corresponds to the location on the first character selection sub-element on the display, means for displaying a portion of the list of identifiers with one or more identifiers associated with first content items; means for detecting an input at a location on the touch-sensitive surface that corresponds to a location on the second character selection sub-element on the display; and, in response to detecting the input at the location on the touch-sensitive surface that corresponds to the location on the second character selection sub-element on the display, means for displaying a portion of the list of identifiers with one or more identifiers associated with second content items.

In accordance with some embodiments, an electronic device includes a display unit for displaying a portion of a list of identifiers and a character selection element for navigating the list of identifiers. The list of identifiers is associated with a first number of first content items associated with a first language and a second number of second content items, distinct from the first content items, associated with a second language distinct from the first language. The character selection element represents a plurality of characters and includes: a first character selection sub-element associated with the first content items and having a first size, and a second character selection sub-element associated with the second content items and having a second size, the first size relative to the second size being based on the first number relative to the second number. The electronic device also includes a touch-sensitive unit for receiving a user input; and a processing unit, coupled to the display unit and the touch-sensitive unit. The processing unit is configured to display on the display unit, in response to detecting an input at a location on the touch-sensitive unit that corresponds to a location on the first character selection sub-element on the display unit, a portion of the list of identifiers with one or more identifiers associated with first content items. The processing unit is also configured to display on the display unit, in response to detecting an input at a location on the touch-sensitive unit that corresponds to a location on the second character selection sub-element on the display unit, a portion of the list of identifiers with one or more identifiers associated with second content items.

Thus, electronic devices with displays and touch-sensitive surfaces are provided with faster, more efficient methods and interfaces for navigating a list of items, thereby increasing the effectiveness, efficiency, and user satisfaction with such devices. Such methods and interfaces may complement or replace conventional methods for navigating a list of items.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Many electronic devices have graphical user interfaces for accessing items such as digital content (e.g., music and videos), electronic documents, and so forth. The graphical user interface may include lists and sub-lists of identifiers associated with the items. An item is accessed by navigating the lists and sub-lists of identifiers and selecting the identifier that corresponds to the desired item.

Here, an electronic device is disclosed that displays a character selection element, such as an index bar, for skipping to particular identifiers in a list (e.g., identifiers that start with a particular letter). The character selection element includes at least two sub-elements. A first sub-element represents characters in a first language (e.g., Japanese characters) and is used to navigate though content in the first language (e.g., Japanese content). A second sub-element represents characters in a second language (e.g., English letters) and is used to navigate though content in the second language (e.g., English content). The character selection sub-elements are sized according to the relative numbers of content items in each respective language on the device. For example, if a user has a music player application with 3000 songs, including 2000 Japanese songs and 1000 English songs, then the length of the Japanese character selection sub-element would be twice the length of the English character selection sub-element. Similarly, if a user has a music player application with 6000 songs, including 3000 Chinese songs, 2000 Japanese songs and 1000 English songs, then the ratio of the lengths of the Chinese, Japanese, and English character selection sub-elements would be 3:2:1, respectively. Thus, the character selection element gives the user a visual cue as to the relative number of content items in particular languages that are stored in the device. In addition, a user can interact with a respective character selection sub-element (e.g., via a finger gesture on the sub-element) to quickly navigate through content in a particular language on the device. Thus, interaction with the character selection element streamlines access to content items in different languages. This sort of navigation is particularly useful on portable devices with small touch screen displays, such as portable media players.

Figure 5A:
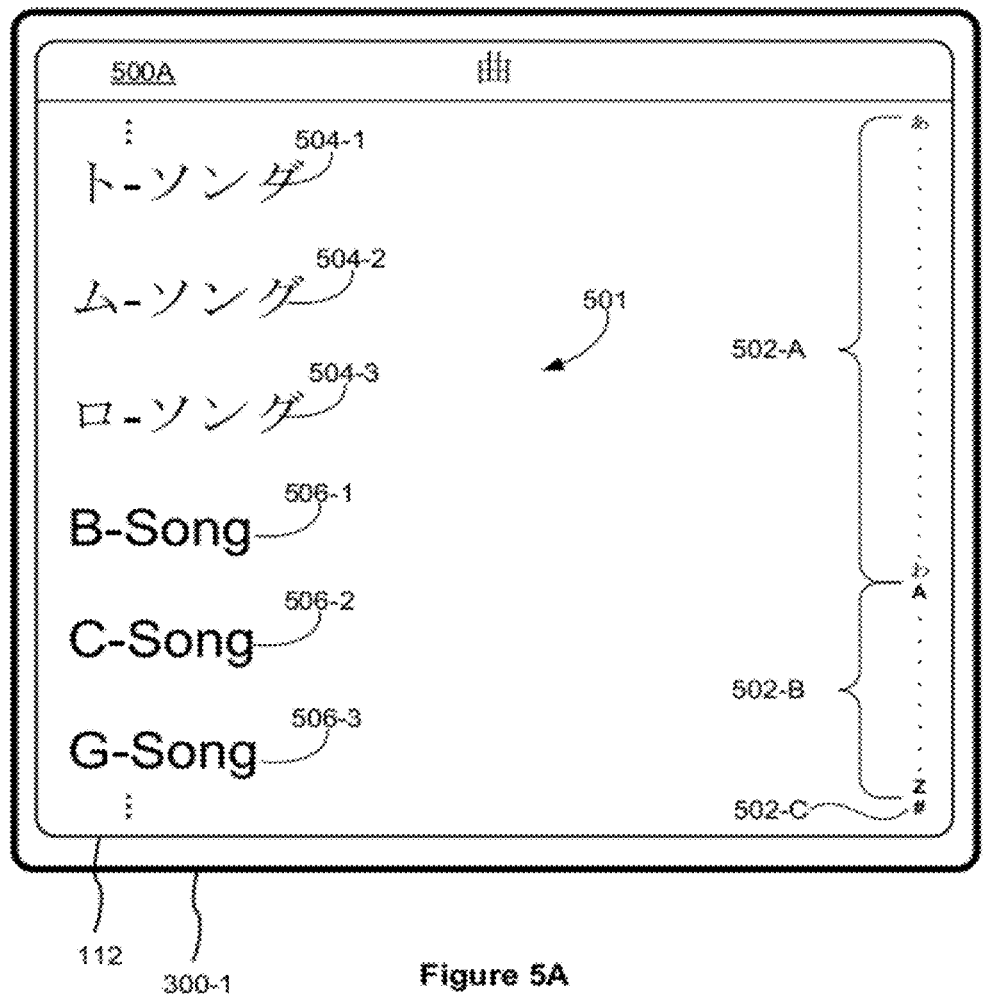
FIGS. 5A-5N illustrate exemplary user interfaces for navigating a list of identifiers in accordance with some embodiments.
Figure 6:
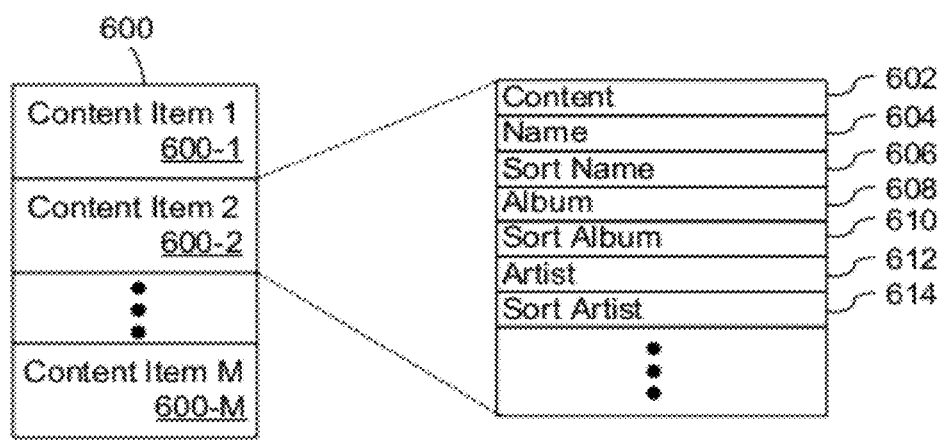
FIG. 6 is a block diagram of a data structure for a content item database in accordance to some embodiments.
Figure 7A:
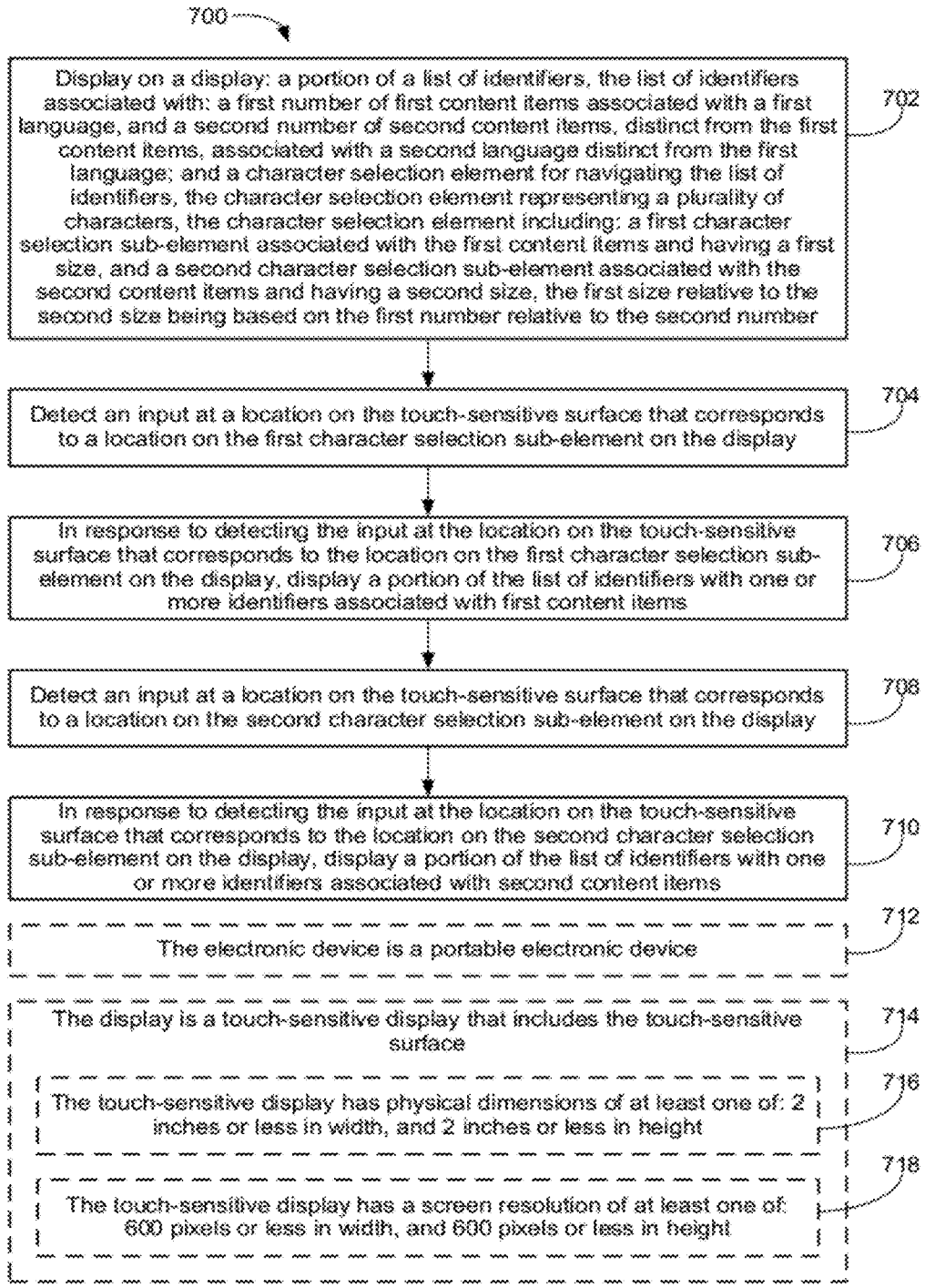
FIGS. 7A-7D are flow diagrams illustrating a method of navigating a list of identifiers in accordance with some embodiments.
Figure 7B:
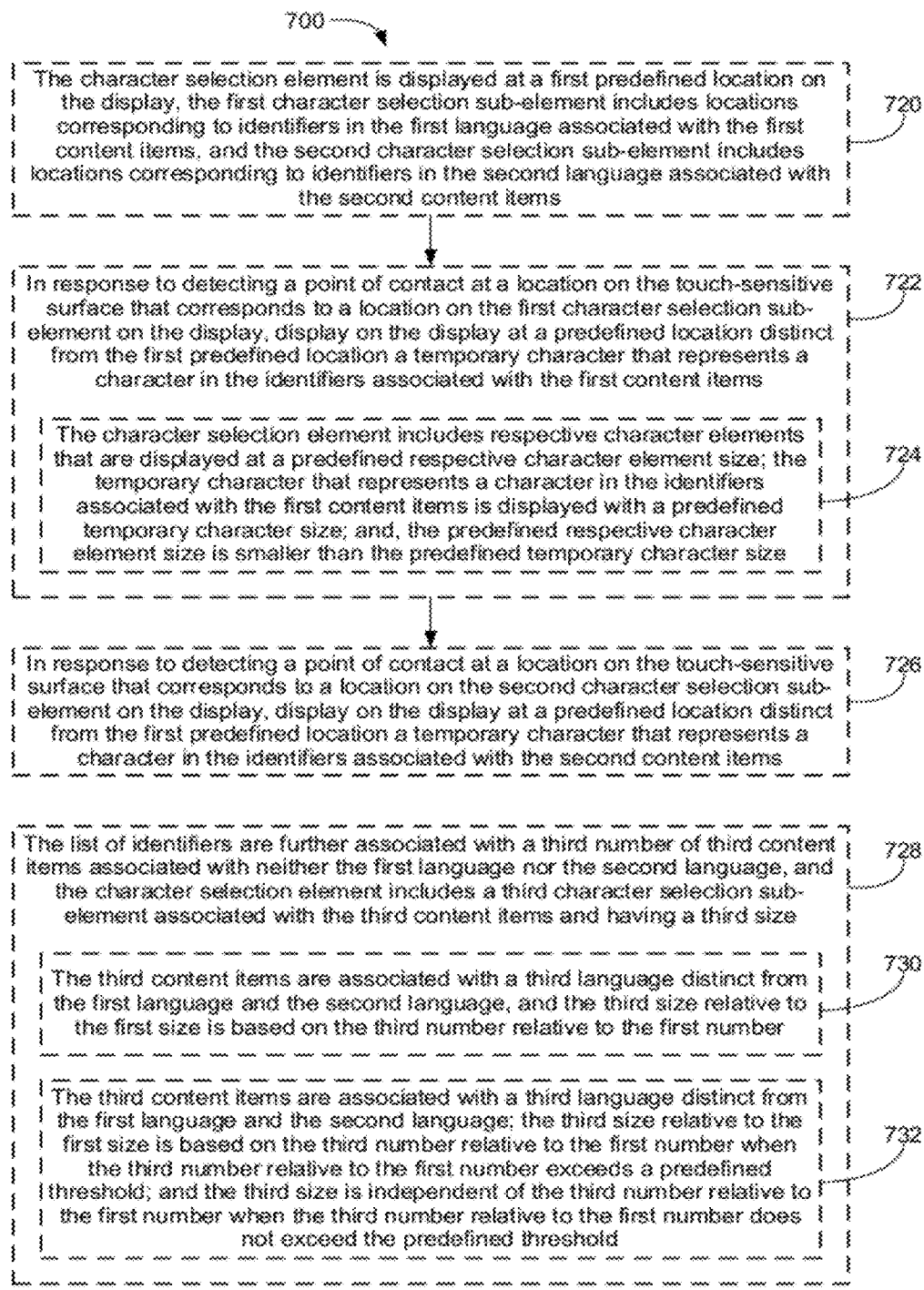
Figure 7C:
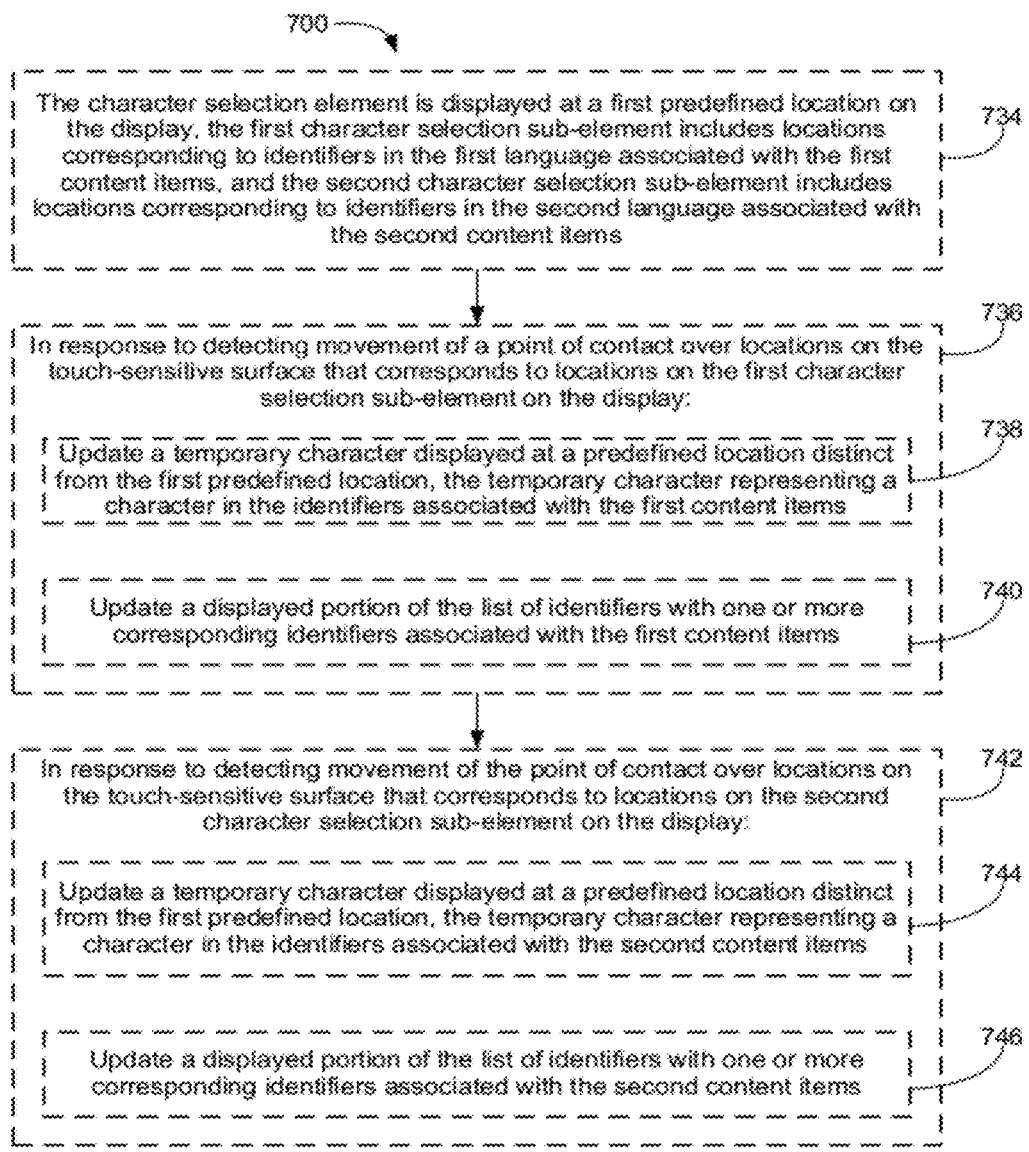
Figure 7D:

Below, FIGS. 1A-1B, 2, 3A, 3B, and 8 provide a description of exemplary devices. FIGS. 4A-4B and 5A-5N illustrate exemplary user interfaces for navigating a list of identifiers for content items in more than one language. FIG. 6 illustrates an exemplary data structure for content items. FIGS. 7A-7D are flow diagrams illustrating a method of navigating a list of identifiers. The user interfaces in FIGS. 5A-5N are used to illustrate the processes in FIGS. 7A-7D.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, iPod Nano®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
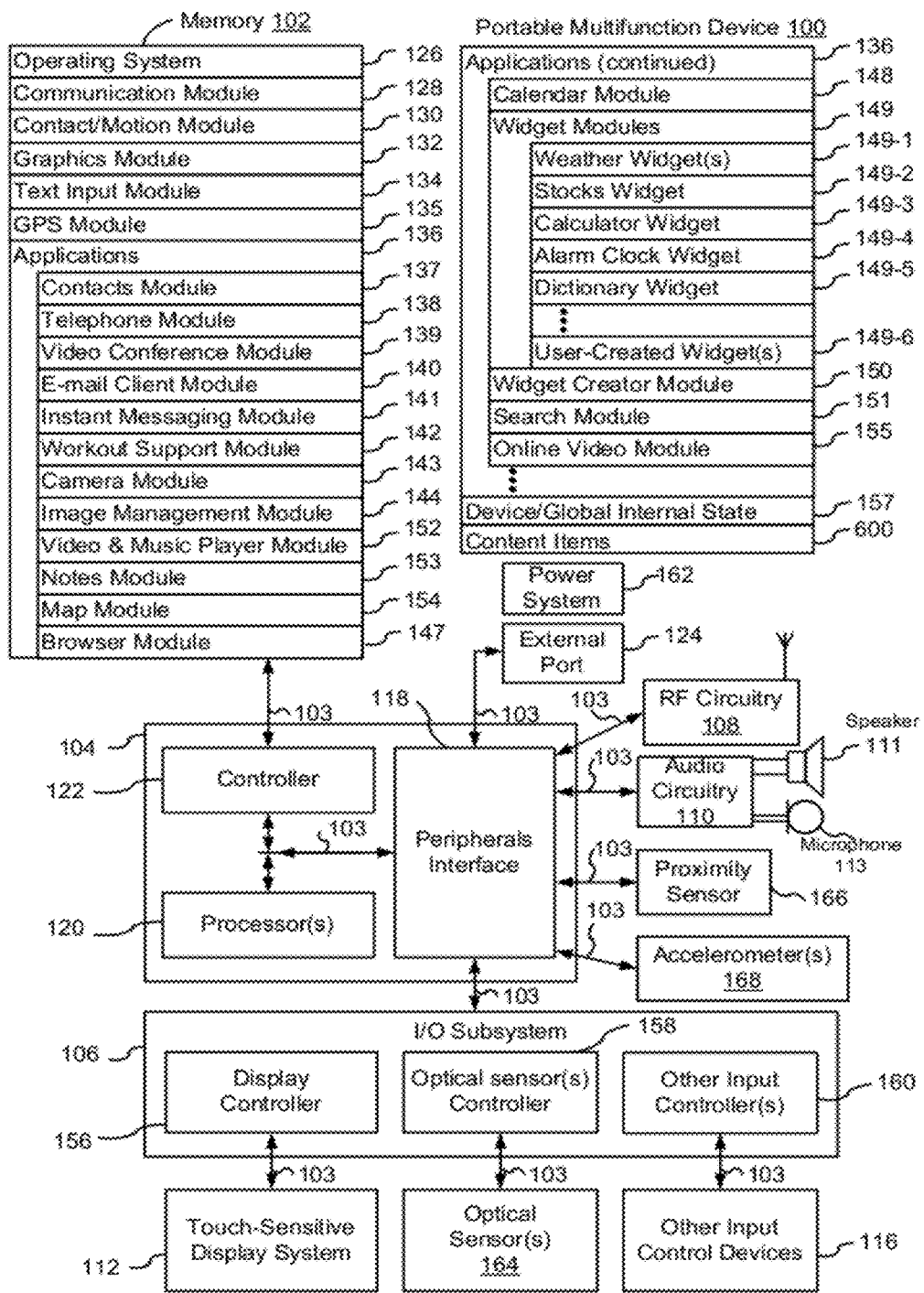
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more non-transitory computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, iPod Nano®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

One or more content items 600 may be stored in memory 102. Content items 600 may include text, music, sound, image, video, and/or other files. A respective content item 600 may be opened by any compatible or suitable application 136.

Figure 1B:
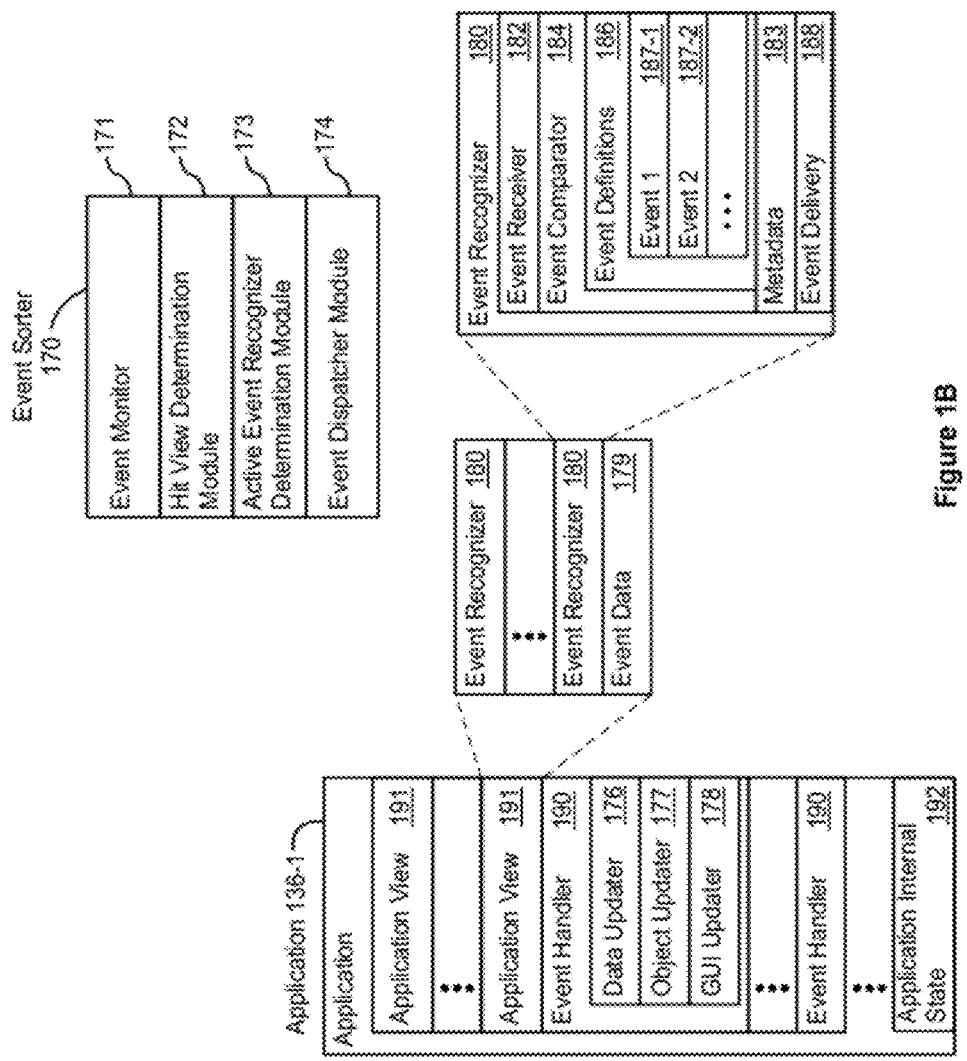
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
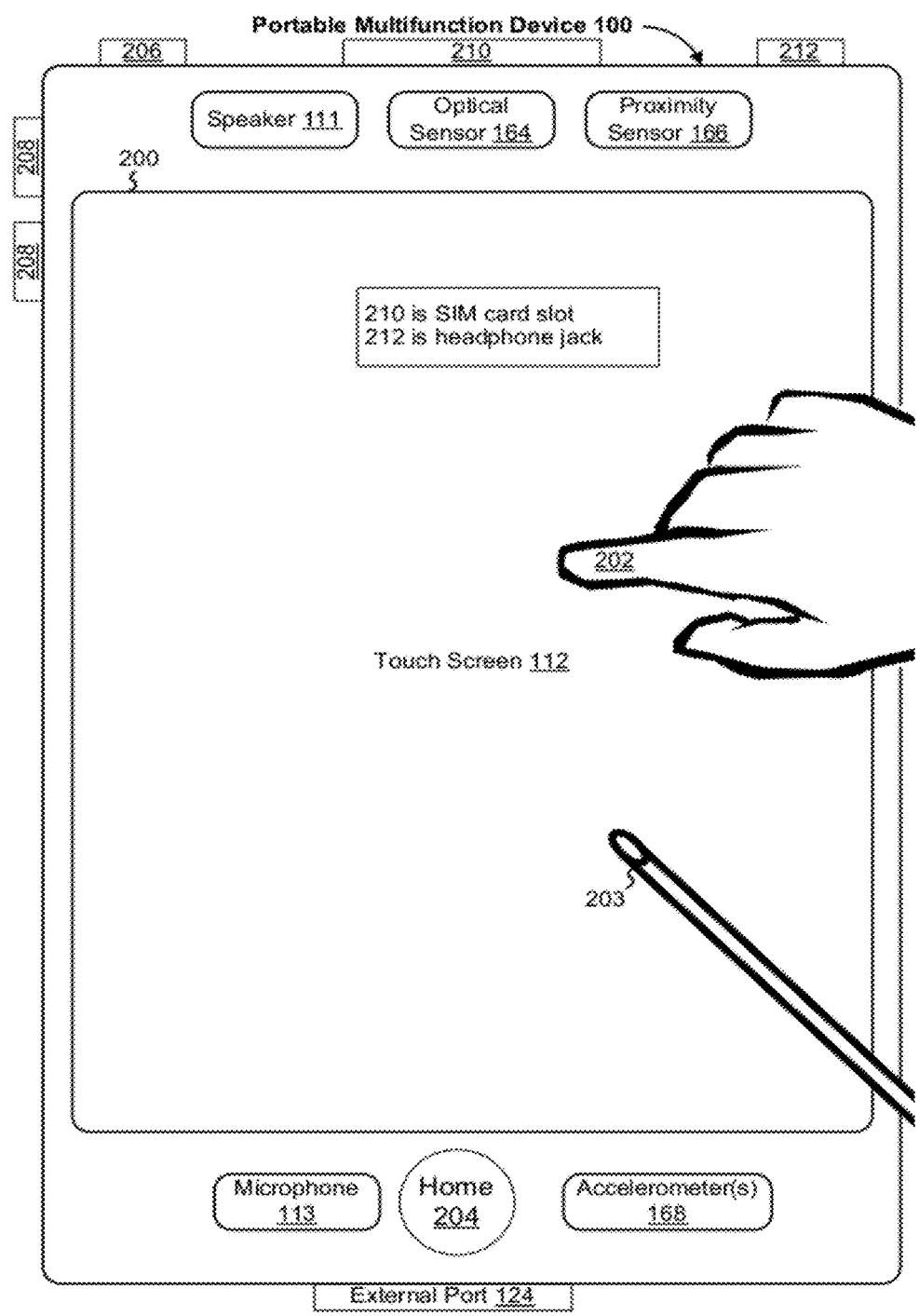
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

Figure 3A:
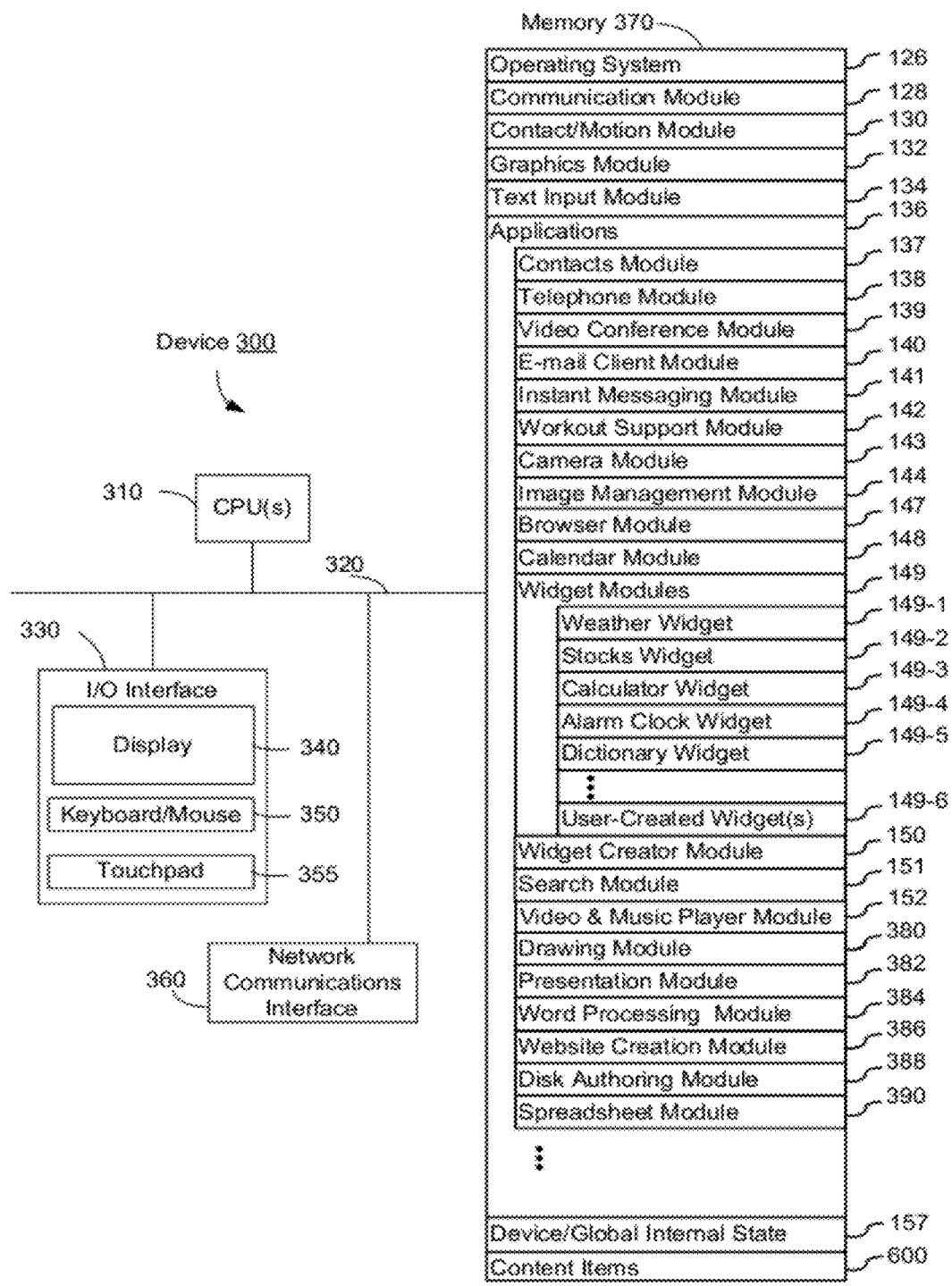
FIG. 3A is a block diagram of an exemplary multifunction device with a display and a touch-sensitive surface in accordance with some embodiments.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

One or more content items 600 may be stored in memory 370. Content items 600 may include text, music, sound, image, video, and/or other files. A respective content item 600 may be opened by any compatible or suitable application 136.

Each of the above identified elements in FIG. 3A may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Figure 3B:
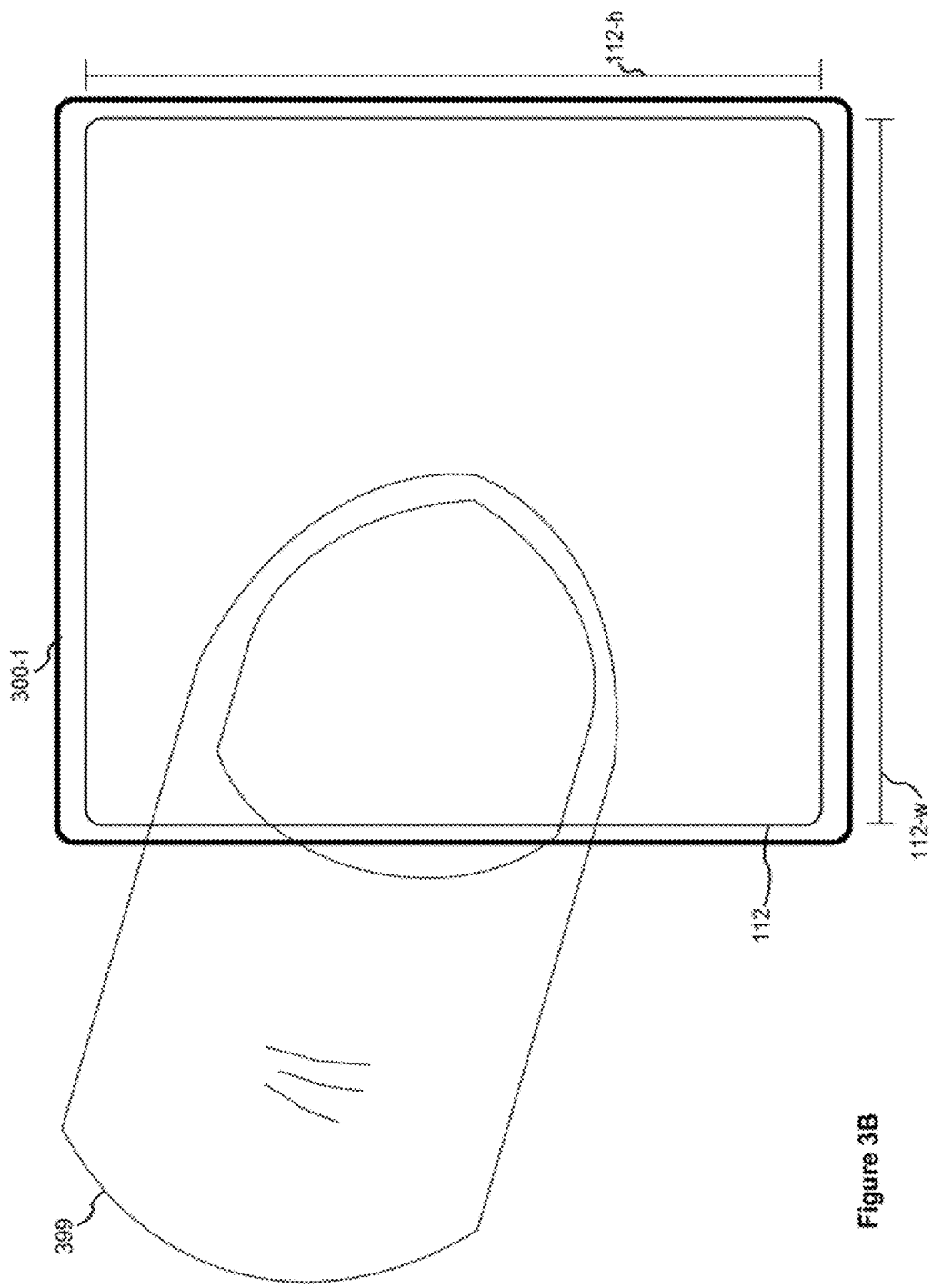
FIG. 3B illustrates an exemplary portable electronic device with a touch-screen in accordance with some embodiments.

Though electronic device 300 is depicted as a multifunction device including I/O interface 330 that incorporates keyboard/mouse 350 and touchpad 355, in some embodiments, electronic device 300-1, as illustrated in FIG. 3B, is a portable electronic device that uses touch-screen 112 without a keyboard, mouse, or independent touchpad. In some embodiments, device 300 is a portable electronic device with touch-screen 112, and is used principally as a portable media player.

For example, portable electronic device 300-1 includes touch-screen 112 with width 112-*w* and height 112-*h*, which in this example are both 2 inches. User's thumb 399, shown superimposed on touch-screen 112, is approximately half the width 112-*w* or height 112-*h* of touch-screen 112.

Thus, in some portable media player embodiments, touch-screen 112 may have physical dimensions of 2 inches or less in width and/or height. In some portable media player embodiments, touch-screen 112 may have a screen resolution of 600 pixels or less in width and/or height. In some portable media player embodiments, touch-screen 112 may have a screen resolution of 900 pixels or less in width and/or height. In some portable media player embodiments, touch-screen 112 may have a screen resolution of 1200 pixels or less in width and/or height.

In some embodiments, memory 370 may store a subset of the modules and data structures identified above. In some portable media player embodiments, electronic device 300-1 may be a smaller physical device, and typically would not include certain of the module, data structures, and applications identified above that would be used in full-featured portable multifunction devices, e.g., as a portable electronic device 300-1 with touch-screen 112, one or more of the following may not be included: telephone module 138, image management module 144, drawing module 380, presentation module 382, word processing module 384, website creation module 386, and disk authoring module 388.

Attention is now directed towards embodiments of user interfaces ("UI") that may be implemented on portable multifunction device 100.

Figure 4A:
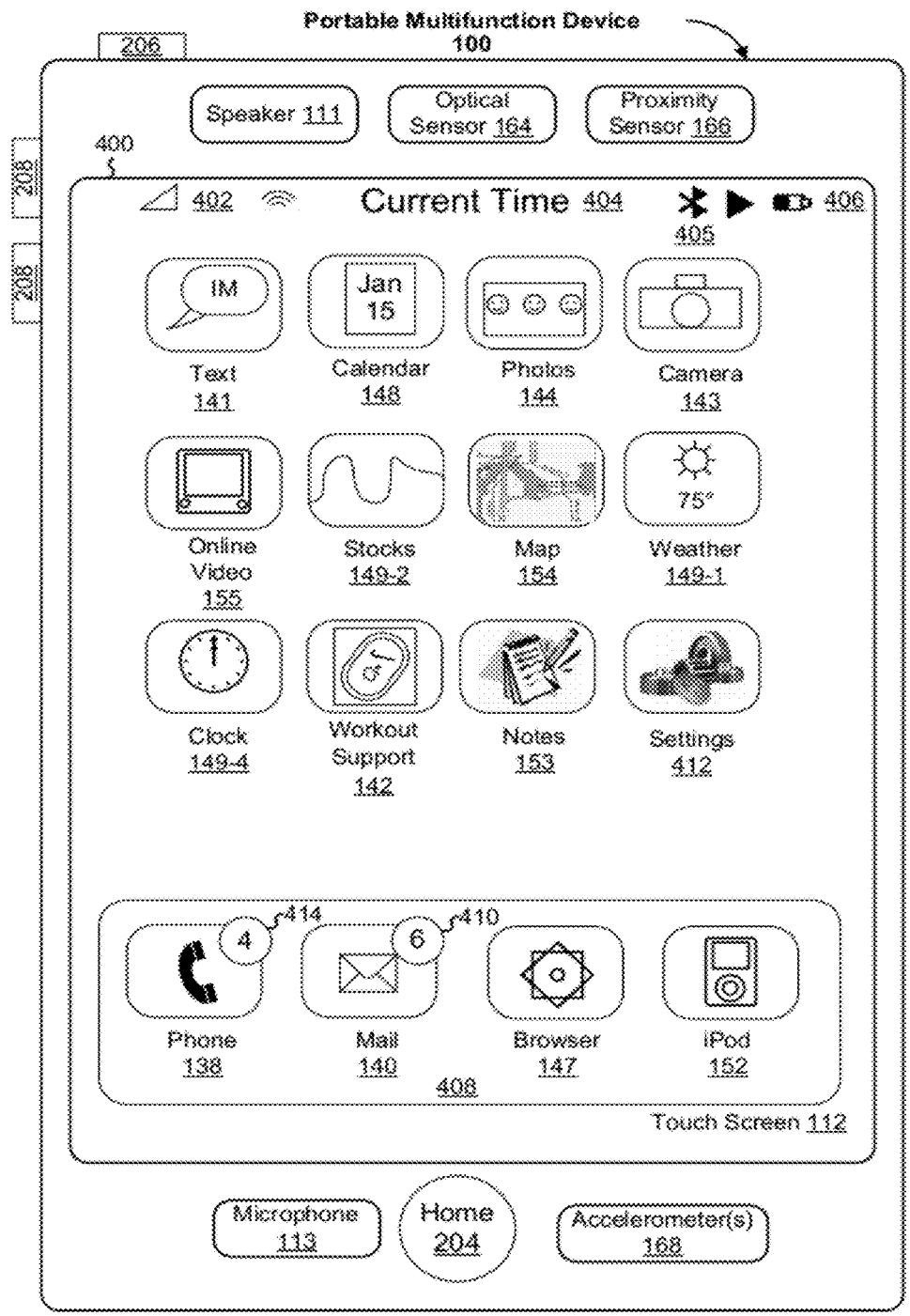
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
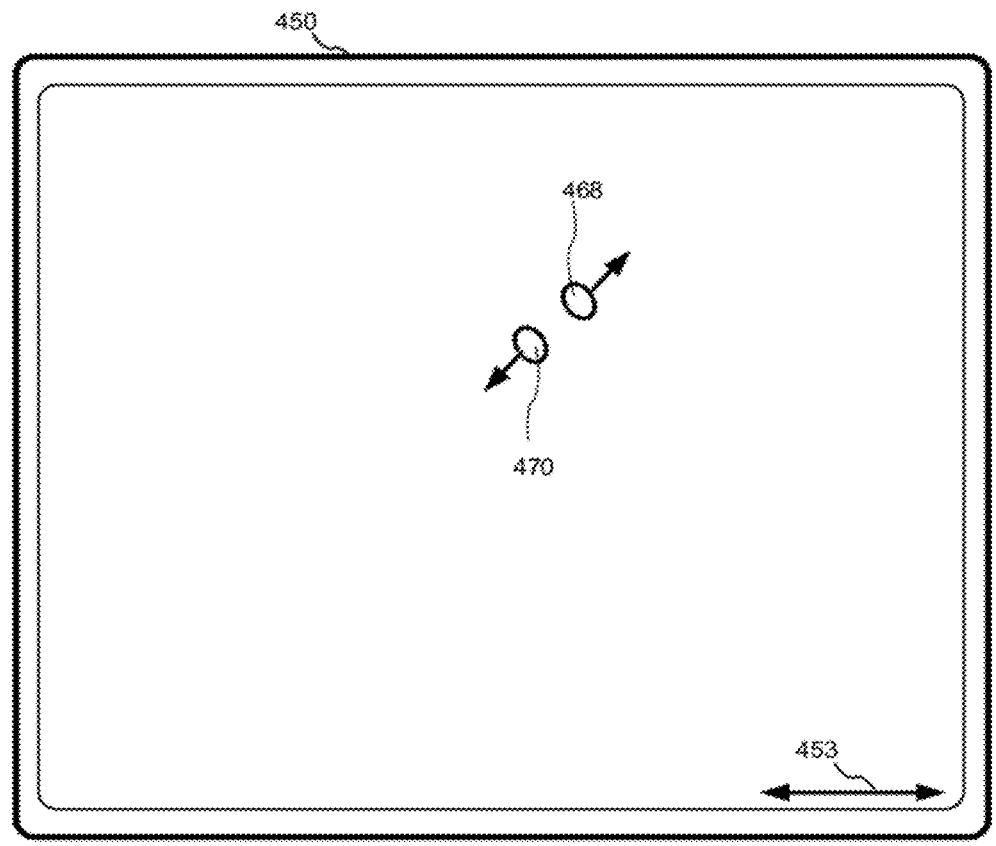
FIG. 4B illustrates an exemplary user interface for a multifunction device with a touch-sensitive surface that is separate from the display in accordance with some embodiments.
Figure 4B:
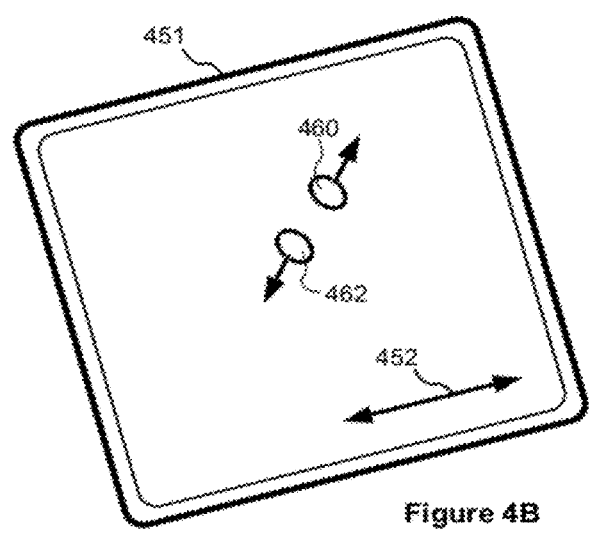

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact).

User Interfaces and Associated Processes

Attention is now directed towards embodiments of user interfaces ("UI") and associated processes that may be implemented on an electronic device with a display and a touch-sensitive surface, such as device 300-1 or portable multifunction device 100.

FIGS. 5A-5N illustrate exemplary user interfaces for navigating a list of identifiers in accordance with some embodiments. The user interfaces in these figures are used to illustrate the processes described below, including the processes in FIGS. 7A-7D.

It should be appreciated that while the embodiments described below are described in the context of content items 600 being audio files (e.g., songs), the described embodiments are applicable to other types of content items (e.g., podcasts, videos, images, documents, etc.) as well.

FIG. 5A illustrates user interface (UI) 500A displayed on display 112 of a device (e.g., device 300-1). UI 500A includes a portion of a listing of songs 501 by song name (also known as "song title"). In UI 500A, song names listing 501 include names 504 written in Japanese and names 506 written in English. Song names written in other languages (not shown) may also be included in song names listing 501. Japanese song names 504 are written using kana characters (hiragana and katakana), kanji characters, or any combination of the above. In some embodiments, Japanese song names 504 are ordered based on the leading kana character and by gojūon order. If the leading character is a kanji character, then the leading character in the furigana (or more generally, ruby text or ruby characters) for the leading kanji character is used for the ordering.

English song names 506 are written in English. In some embodiments, English song names 506 are ordered according to an alphabetical order.

In some embodiments, within song names listing 501, Japanese song names 504 are gathered into one group and ordered within the group, and English song names 506 are gathered into another group and ordered within the group, and any song names written in other languages are treated similarly; Japanese and English song names are not all mixed together within song names listing 501.

Song names 504 and 506 are identifiers for content items 600 stored in memory (e.g., in memory 102 or 370). For example, Japanese song names 504 correspond to Japanese songs and English song names 506 correspond to English songs. In response to detection of a gesture on a respective song name 504 or 506 (e.g., a tap gesture on the respective song name), the content item 600 associated with the respective song name is selected (e.g., for playback, for display of associated information, for further processing, etc.).

In some embodiments, whether a song name (or other identifiers, such as artist, album, composer, etc.) that includes both Japanese characters and English letters is considered to be written in Japanese or English is determined by the leading character in the song name. For example, if a song name has a leading hiragana, katakana, or kanji character in the song name, the song name is considered to be written in Japanese, despite the song name having some English letters as well.

In some embodiments, a song name (or other identifiers, such as artist, album, composer, etc.) that is written as a romanization of a Japanese song name is considered to be an English song name because the song name is written in the same alphabet as English, despite it representing a Japanese song name.

UI 500A also includes character selection element 502A-C (or collectively 502)(also referred to as index bar element 502) near (e.g., adjacent to) the right vertical edge of display 112. Index bar element 502 is displayed as a single column, A position on index bar element 502 represents a leading character in song names in song names listing 501. In response to detection of a gesture at a location (also referred to as position) on index bar element 502, song names listing 501 skips to songs names having a leading character corresponding to the position on index bar element 502 where the finger contact is detected; index bar element 502 indexes song names in song name listing 501 by the leading character. If there are no song names with that leading character, song names listing 501 skips to song names having a leading character closest in the ordering to the leading character corresponding to the position on index bar element 502 where the finger contact is detected, The detection of a gesture on index bar element 502 and the corresponding navigation in song names listing 501 are described in further detail below in relation to FIGS. 5C-5H.

Index bar element 502 includes Japanese sub-element or portion 502-A, English sub-element or portion 502-B, and miscellaneous sub-element or portion 502-C. Japanese sub-element 502-A corresponds to Japanese song names 504. A position on Japanese sub-element 502-A corresponds to a Japanese kana character; the kana characters are ordered in Japanese sub-element 502-A according to Japanese language conventions (e.g., by gojūon order). Japanese sub-element 502-A is displayed with hiragana character "あ" first, and hiragana character "わ" last as a visual aid to the user of the position on Japanese sub-element 502-A relative to the gojūon order of kana; "あ" is the first kana character in the gojūon order, and "わ" is the last kana character in the gojūon order that is used as a leading character in song names ("を", which comes after "わ" in the gojūon order, is typically used as a particle and not in names or words).

English sub-element 502-B corresponds to English song names 506. A position on English sub-element 502-B corresponds to an English letter; the letters are ordered in English sub-element 502-B according to alphabetical order. English sub-element 502-B is displayed with the letter "A" first and the letter "Z" last as a visual aid to the user of the position on English sub-element 502-B relative to English alphabetical order.

Miscellaneous sub-element or portion 502-C is displayed as a predefined symbol (e.g., "#") and typically has a predefined length that is independent of the numbers of songs having identifiers (e.g., song name) in particular languages or ratios of such numbers. Miscellaneous sub-element 502-C corresponds to song names in song names listing 501 written in other languages or where the leading character is not a Japanese character or English letter (e.g., symbol, numeral, Cyrillic letter, Hebrew letter, Arabic letter, etc.).

The size (e.g. length) of Japanese sub-element 502-A as displayed in UI 500A is longer than the size of English sub-element 502-B. In some embodiments, the size difference is based on a ratio of the number of songs having Japanese song names to the number of songs having English song names amongst content items 600. When there are more songs with Japanese song names than songs with English song names, Japanese sub-element 502-A is displayed correspondingly longer than English sub-element 502-B. If songs having Japanese song names slightly outnumber songs having English song names, Japanese sub-element 502-A is displayed slightly longer than English sub-element 502-B. If songs having Japanese song names significantly outnumber songs having English song names, Japanese sub-element 502-A is displayed significantly longer than English sub-element 502-B. The reverse is also true. For example, if songs having Japanese song names are significantly outnumbered by songs having English song names, Japanese sub-element 502-A is displayed significantly shorter than English sub-element 502-B.

Figure 5B:
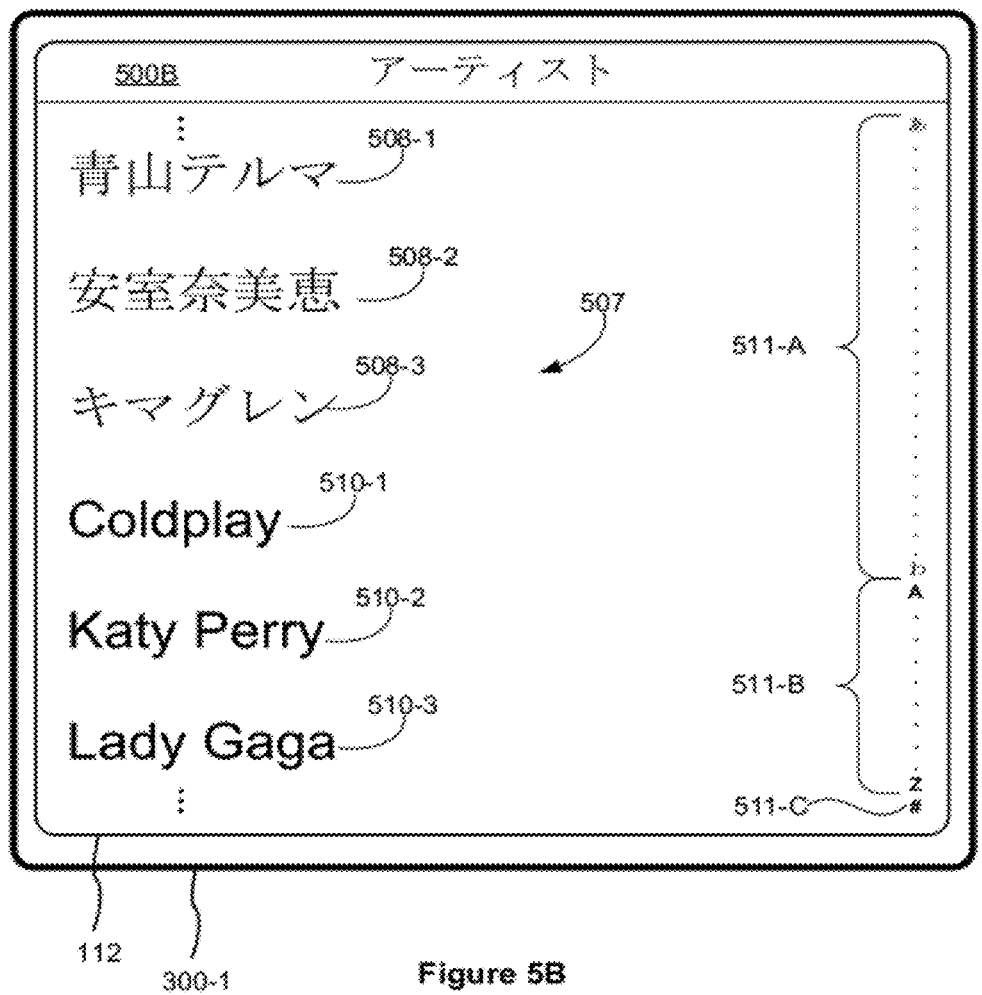

FIG. 5B illustrates UI 500B displayed on display 112. UI 500B includes a portion of a listing of artists 507. In UI 500B, artists listing 507 include artist names 508 written in Japanese and artist names 510 written in English. Artist names written in other languages (not shown) may also be included in artists listing 507. Japanese artist names 508 are written using kana characters (hiragana and katakana), kanji characters, or any combination of the above. In some embodiments, Japanese artist names 508 are ordered in the same manner as Japanese song names 504 (based on the leading kana character and by gojūon order, using the leading character in the furigana as appropriate).

English artist names 508 are written in English. In some embodiments, English artist names 508 are ordered according to alphabetical order.

Artist names 508 and 510 are identifiers for content items 600 stored in memory (e.g., in memory 102 or 370). Selection of a respective artist name 508 or 510 (e.g., by a tap gesture on the respective song name) activates the displaying, on display 112, of a listing of song names corresponding to content items 600 associated with the selected artist name.

In some embodiments, as with song names in song name listing 501, Japanese artist names 508 are gathered into one group and ordered within the group, and English artist names 510 are gathered into another group and ordered within the group, and any artist names written in other languages are treated similarly; Japanese and English artist names are not all mixed together within artist names listing 507.

UI 500B also includes character selection element 511A-C (or collectively 511)(also referred to as index bar element 511) near (e.g., adjacent to) the right vertical edge of display 112. Index bar element 511 is similar to index bar element 502, with the difference that positions on index bar element 511 correspond to leading characters in artist names in artists listing 507. As with index bar element 502, index bar element 511 also includes Japanese sub-element 511-A, English sub-element 511-B, and miscellaneous sub-element 511-C, which are analogous to sub-elements 502-A, 502-B, and 502-C, respectively, described above with respect to FIG. 5A.

The size (e.g. length) of Japanese sub-element 511-A as displayed in UI 500B is longer than the size of English sub-element 511-B. In some embodiments, the size difference is based on a ratio of the number of songs having Japanese song names to the number of songs having English song names amongst content items 600, as described above. In some embodiments, the size difference is based on a ratio of the number of songs having Japanese artist names to the number of songs having English artist names amongst content items 600. For example, when there are more songs with Japanese artist names than songs with English artist names, Japanese sub-element 511-A is displayed correspondingly longer than English sub-element 511-B. If songs having Japanese artist names slightly outnumber songs having English artist names, Japanese sub-element 511-A is displayed slightly longer than English sub-element 511-B. If songs having Japanese artist names significantly outnumber songs having English artist names, Japanese sub-element 511-A is displayed significantly longer than English sub-element 511-B. The reverse is also true. For example, if songs having Japanese artist names are significantly outnumbered by songs having English artist names, Japanese sub-element 511-A is displayed significantly shorter than English sub-element 511-B. In some embodiments, the size difference is based on a ratio of the number of Japanese artist names to the number of English artist names amongst content items 600.

Figure 5C:
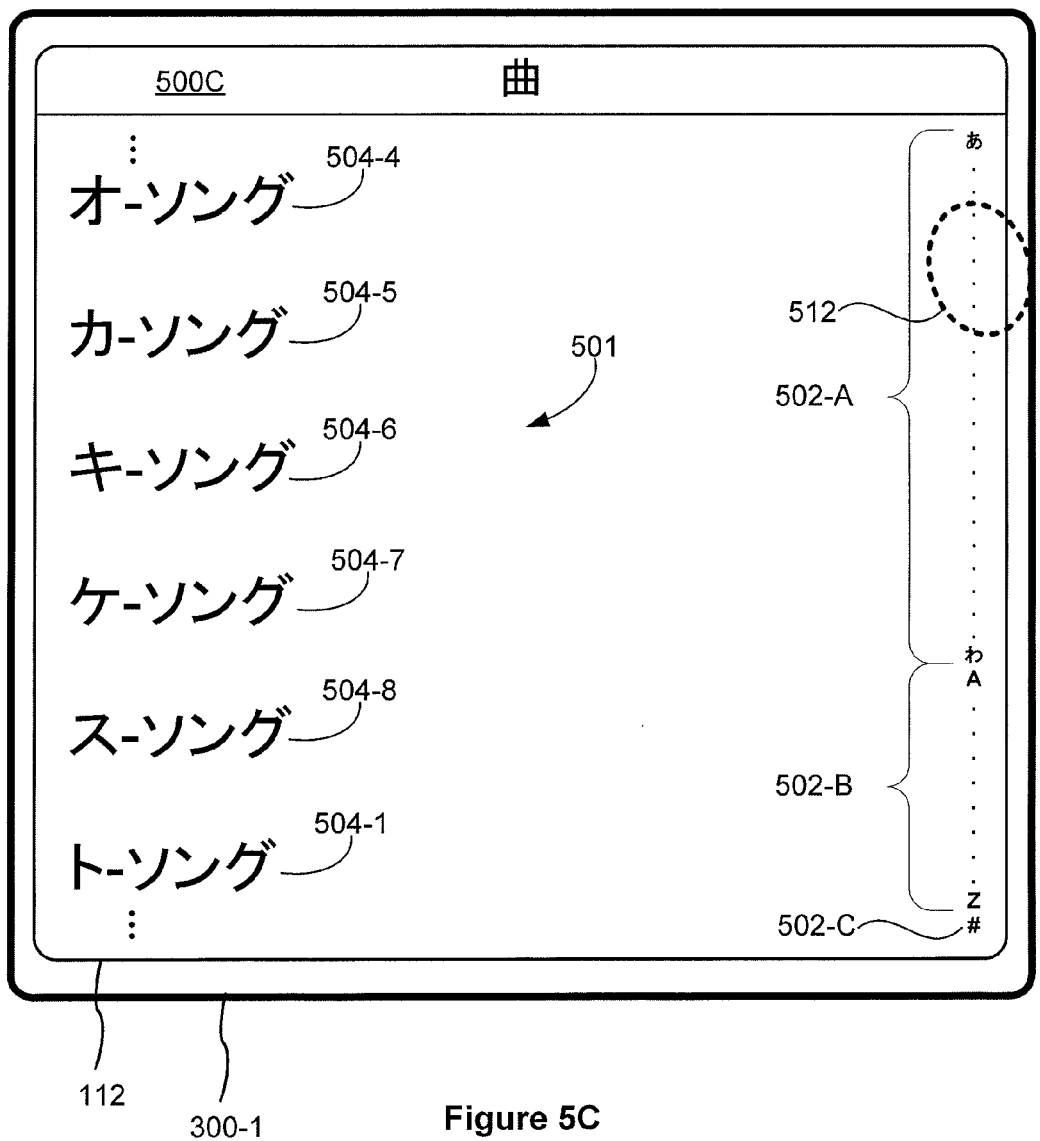

FIG. 5C shows UI 500C, which includes a portion of song name listing 501 that is different from the portion of song name listing 501 shown in FIG. 5A. Gesture 512 (e.g., a finger tap gesture) is detected on Japanese sub-element 502-A. In response to detection of gesture 512, song names listing 501 skips to Japanese song names 504 having a leading character corresponding to the location (also referred to as position) on Japanese sub-element 502-A where gesture 512 is detected, as shown in FIG. 5C. If there are no song names having that leading character, song names listing 501 skips to song names having a leading character near (in some embodiments, closest to) the character corresponding to the position of gesture 512. Thus, in FIG. 5C, gesture 512 is positioned nearer to the beginning of Japanese sub-element 502-A, and thus corresponds to a kana character nearer to the beginning of the gojūon order. Indeed, in response to detection of gesture 512, song names listing 501 shows song names 504 with leading characters nearer to the beginning of the gojūon order.

Figure 5D:
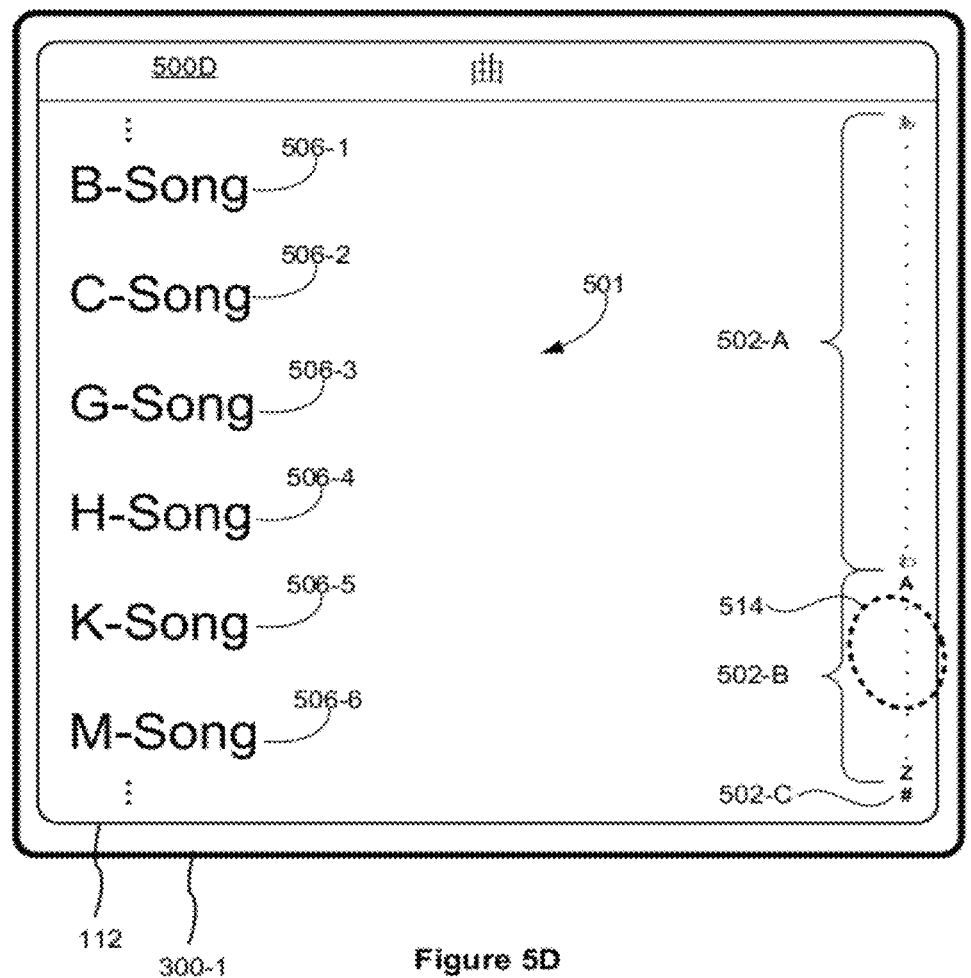

FIG. 5D shows UI 500D, which includes a portion of song name listing 501 that is different from the portion of song name listing 501 shown in FIG. 5A. Gesture 514 (e.g., a finger tap gesture) is detected on English sub-element 502-B. In response to detection of gesture 514, song names listing 501 skips to English song names 506 having a leading character corresponding to the location (also referred to as position) on English sub-element 502-B where gesture 514 is detected, as shown in FIG. 5D. If there are no song names having that leading character, song names listing 501 skips to song names having a leading character near (in some embodiments, closest to) the character corresponding to the position of gesture 514.

Figure 5E:
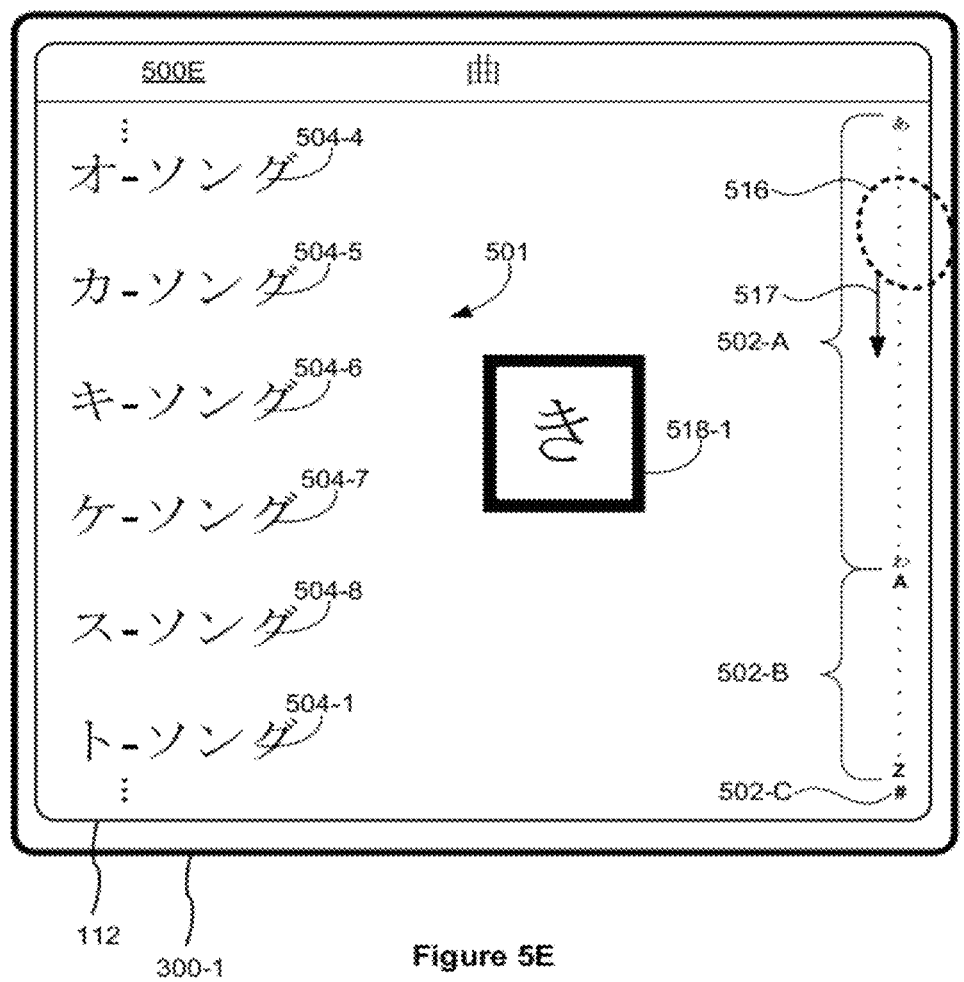

FIG. 5E shows UI 500E with a portion of song names listing 501. Gesture 516 (e.g., a finger dragging gesture) with movement 517 is detected on Japanese sub-element 502-A. In response to detection of gesture 516, song names listing 501 skips to Japanese song names 504 having a leading character corresponding to the position on Japanese sub-element 502-A where gesture 516 is detected. As gesture 516 moves in direction 517, song names listing 501 skips to display other song names in accordance with the changed position of the contact in gesture 516.

In some embodiments, temporary character 518 is displayed when gesture 516 is detected on index bar element 502. Temporary character 518 shows the character in index bar 502 corresponding to the current position of gesture 516. For example, in FIG. 5E, "き", corresponding to the current position of gesture 516, is displayed as temporary character 518-1, and song names listing 501 skips to display song names having "き" or its katakana equivalent "キ" as the leading character (e.g., song name 504-6).

Figure 5F:
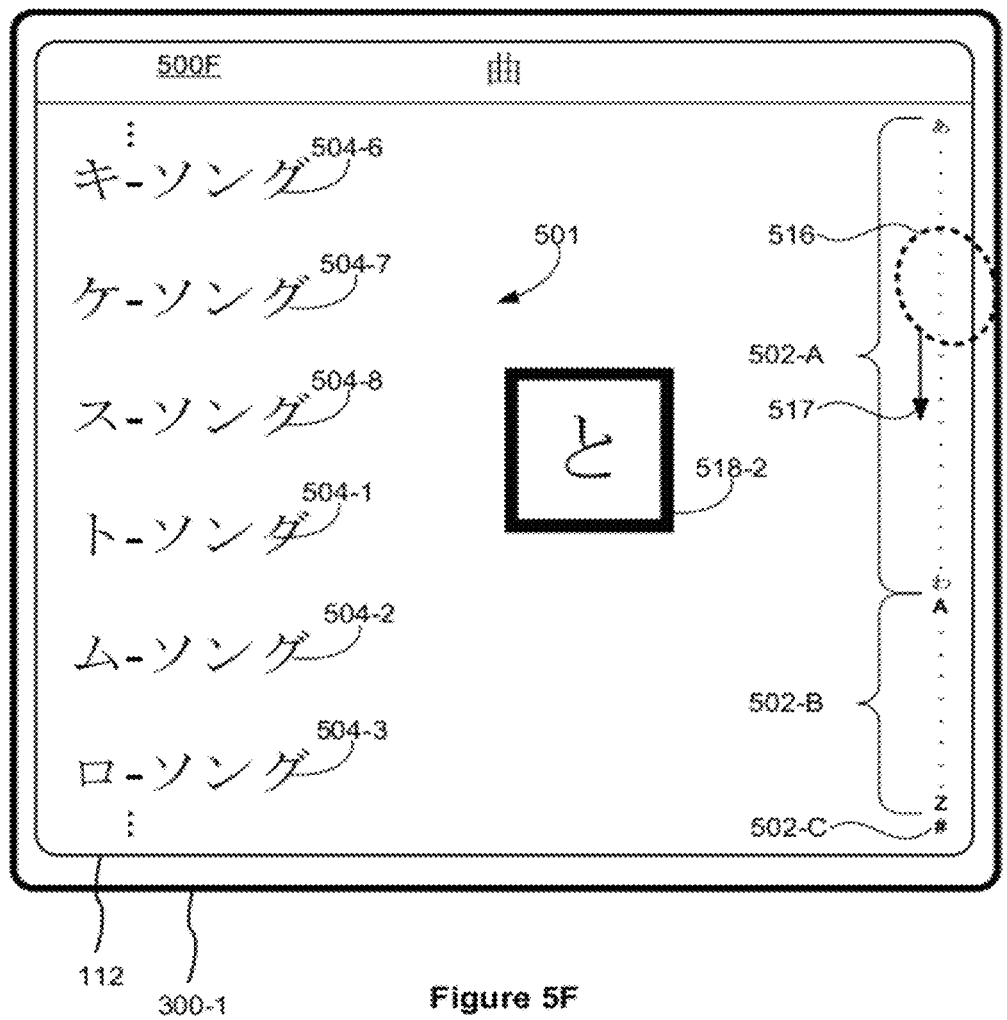

As the contact in gesture 516 moves in direction 517 on index bar 502, temporary character 518 updates as song names listing 501 displays other song names in accordance with the new, updated position of the contact in gesture 516. For example, FIG. 5F shows UI 500F, where the contact in gesture 516 moves in direction 517 to a new position on index bar 502. "と", corresponding to the current position of the contact in gesture 516, is displayed as temporary character 518-2, and song names listing 501 skips to display song names having "と" or its katakana equivalent "ト" as the leading character (e.g., song name 504-1).

Figure 5G:
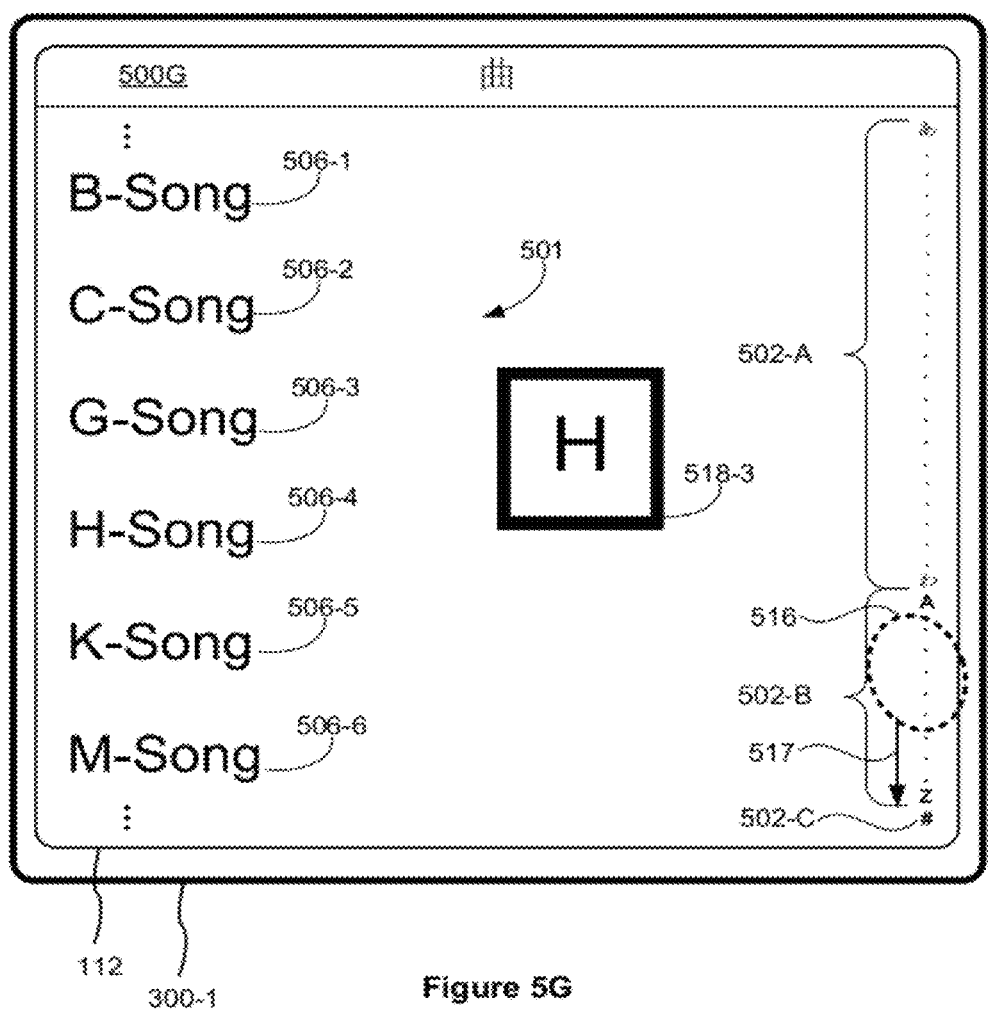

FIG. 5G shows UI 500G, where the contact in gesture 516 moves further in direction 517 on index bar 502, crossing over from Japanese sub-element 502-A to English sub-element 502-B. "H", corresponding to the current position of the contact in gesture 516, is displayed as temporary character 518-3, and song names listing 501 skips to display song names having "H" as the leading character (e.g., song name 506-4).

Figure 5H:
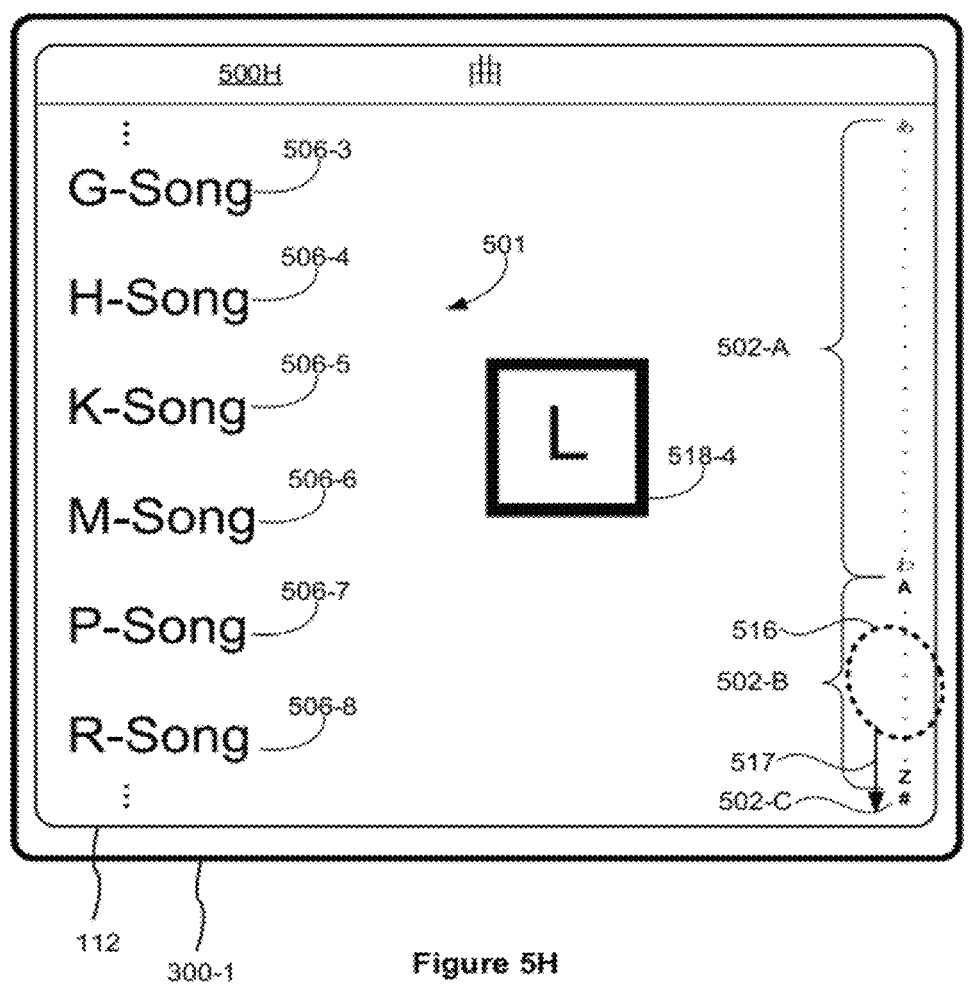

FIG. 5H shows UI 500H, where the contact in gesture 516 moves further in direction 517 on index bar 502. "L", corresponding to the current position of the contact in gesture 516, is displayed as temporary character 518-4. In this example, English song names 506 do not include any song names with leading character "L", so song names listing 501 skips to display song names having "K" as the leading character (e.g., song name 506-5), the letter closest to "L" in the alphabetical order for which song names 506 with that leading character are present.

Figure 5I:
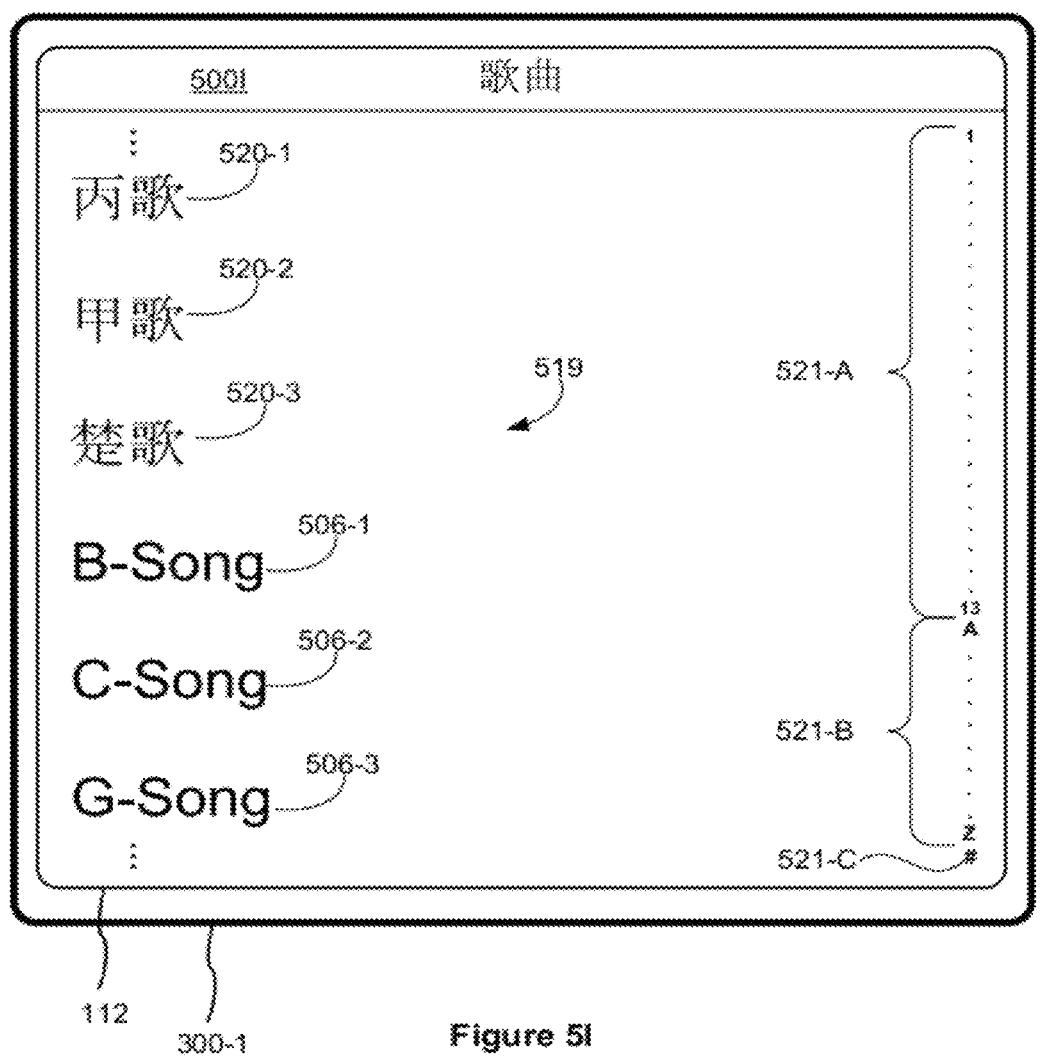

FIG. 5I shows UI 500I, which includes a portion of song names listing 519, which is similar to song names listing 501. Song names listing 519 includes Chinese song names 520 and English song names 506. Chinese song names 520 are ordered according to the stroke count of the leading character; the leading character in song name 520-1 has the same number of strokes as the leading character in song name 520-2, which has fewer strokes than the leading character in song name 520-3. In some embodiments, if the leading characters have the same number of strokes, the stroke counts of the second characters of the song names are used as a tiebreaker. In some other embodiments, no tiebreaker is used; songs names where the leading characters have the same number of strokes are listed, amongst themselves, in random order. As with Japanese song names 502, Chinese song names 520 are not mixed with English song names 506 within song names listing 519.

UI 500I also includes character selection element 521A-C (or collectively 521)(also referred to as index bar element 521), which is similar in operation and appearance to index bar elements 502 and 511. Index bar element 521 includes Chinese sub-element 521-A, English sub-element 521-B, and miscellaneous sub-element 521-C. The length of Chinese sub-element 521-A relative to the length of English sub-element 521-B is (analogous to the length of Japanese sub-element 502-A relative to the length of English sub-element 502-B or the length of Japanese sub-element 511-A relative to the length of English sub-element 511-B) based on the ratio of the number of songs with Chinese names to the number of songs with English names amongst content items 600.

A location (also referred to as position) on Chinese sub-element 521-A corresponds to a number, where the number represents a number of strokes in the leading character of a song name 520. Thus, for example, Chinese sub-element 521-A is displayed as starting at 1 and ending at 13. In response to detection of a gesture on Chinese sub-element 521-A, song names listing 519 skips to display Chinese song names 520 having a leading character with a stroke count that corresponds (or is closest to the stroke count that corresponds) to the position on Chinese sub-element 521-A where the gesture is detected.

Figure 5J:
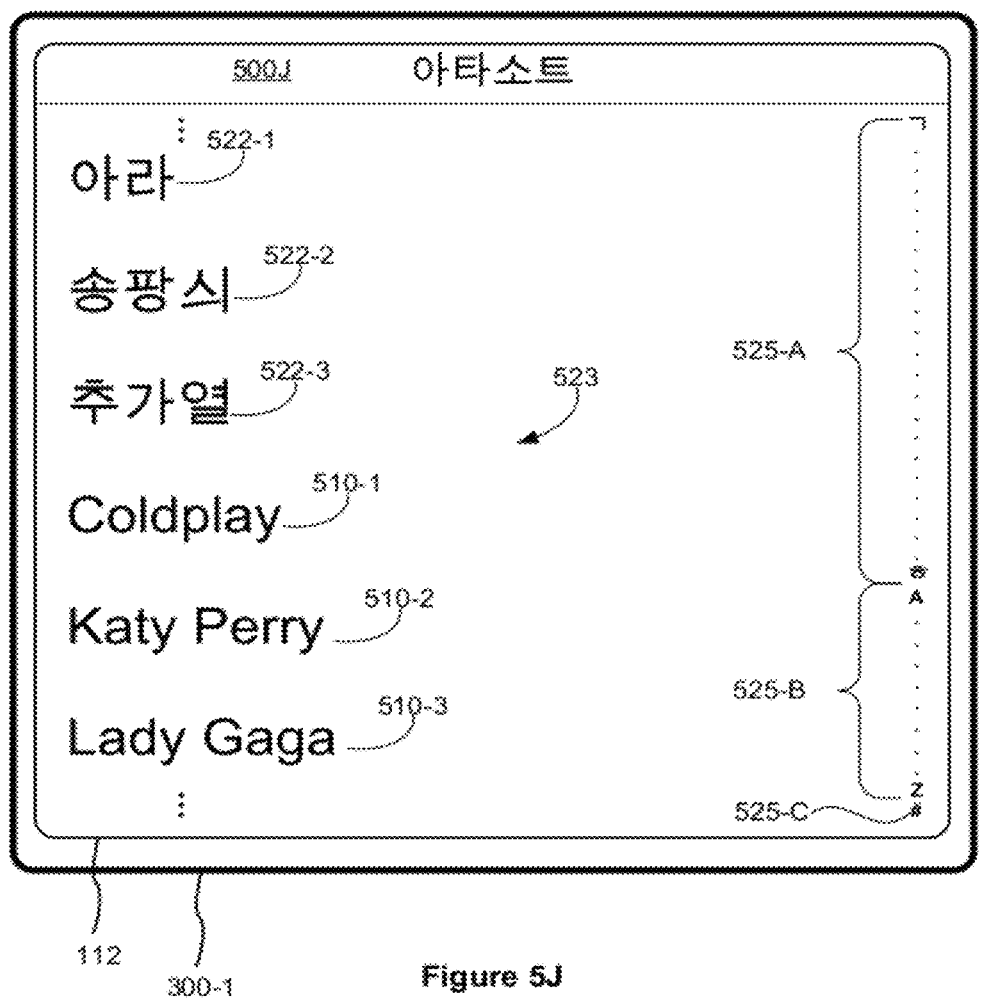

FIG. 5J shows UI 500J, which includes a portion of artist names listing 523, which is analogous to artist names listing 507. Artist names listing 523 includes Korean artist names 522 and English artist names 510. Korean artist names 522 are ordered according to Hangul alphabetical order. Korean artist names 522 are not mixed with English artist names 510 within artist names listing 523.

UI 500J also includes character selection element 525A-C (or collectively 525)(also referred to as index bar element 525), which is analogous in operation and appearance to index bar elements 502, 511, and 521. index bar element 525 includes Korean sub-element 525-A, English sub-element 525-B, and miscellaneous sub-element 525-C. In some embodiments, the length of Korean sub-element 525-A relative to the length of English sub-element 525-B is (similar to the length of Japanese sub-element 511-A relative to the length of English sub-element 511-B) based on the ratio of the number of songs with Korean artist names to the number of songs with English artist names amongst content items 600. In some embodiments, the length of Korean sub-element 525-A relative to the length of English sub-element 525-B is (similar to the length of Japanese sub-element 502-A relative to the length of English sub-element 502-B) based on the ratio of the number of songs with Korean song names to the number of songs with English song names amongst content items 600. In some embodiments, the size difference is based on a ratio of the number of Korean artist names to the number of English artist names amongst content items 600.

A position on Korean sub-element 525-A corresponds to a character in the Hangul alphabet. Thus, for example, Korean sub-element 525-A is displayed as starting with the first character in the Hangul alphabet and ending with the last character in the Hangul alphabet. In response to detection of a gesture on Korean sub-element 525-A, artist names listing 523 skips to display Korean artist names 522 having a leading character that corresponds (or is closest to the character that corresponds) to the location (position) on Korean sub-element 525-A where the gesture is detected.

Figure 5K:
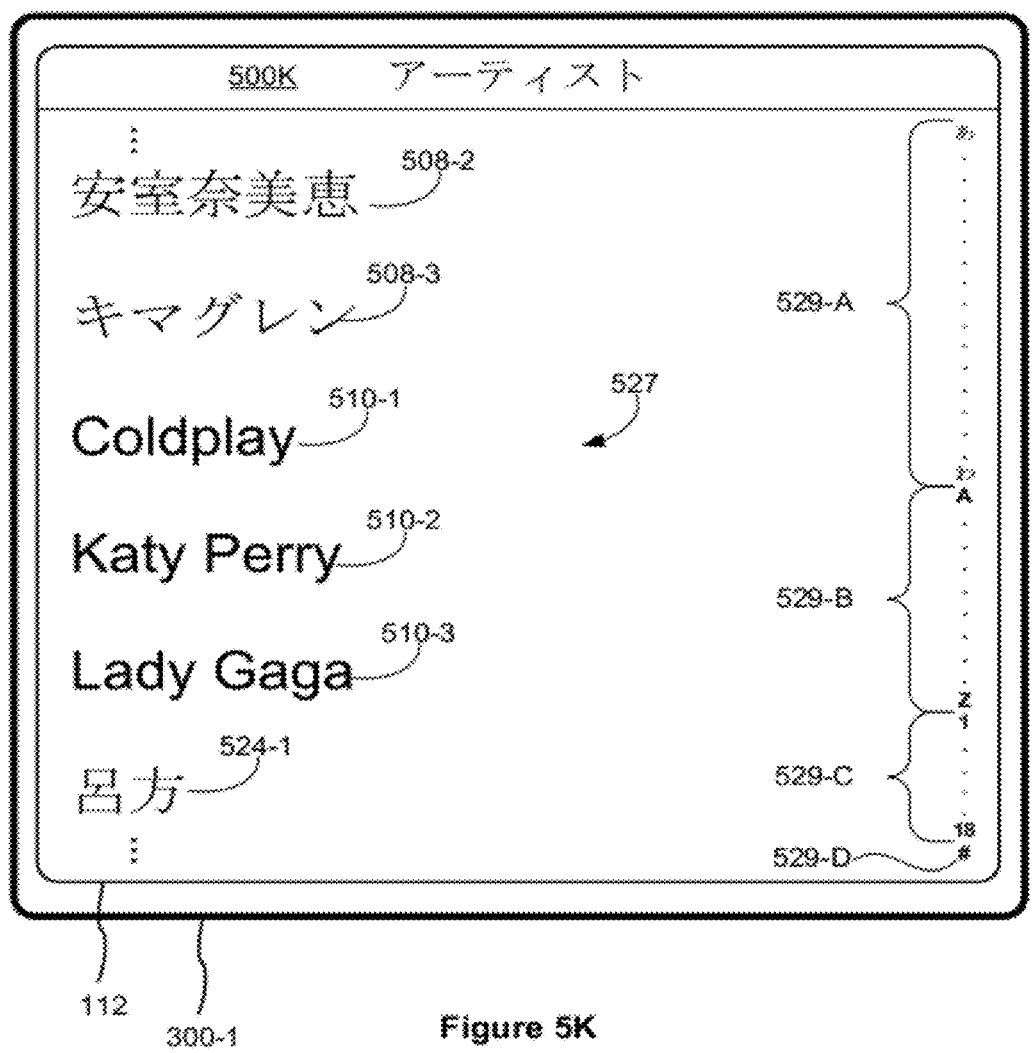

FIG. 5K shows UI 500K, with a portion of artist names listing 527. Artist names listing 527 includes Japanese artist names 508, English artist names 510, and Chinese artist names 524. Artist names listing 527 operate in a similar manner as artist names listing 507, 523, and thus details of artist names listing 527 are omitted for brevity. Note that concurrent display of three types of identifiers (e.g., Japanese, English, and Chinese artists names in FIG. 5K) is shown to help describe this embodiment, but would be unusual on a portable device with a small display. For a device with three different types of identifiers, display of a portion of the list of identifiers with a single type of identifier or concurrent display of two types of identifiers (e.g., a portion of the list of identifiers where a first type of identifier ends and a second type of identifier begins) would be more typical, especially if the device contains a large number of content items.

UI 500K also includes character selection element 529A-C (or collectively 529)(also referred to as index bar element 529), with Japanese sub-element 529-A, English sub-element 529-B, Chinese sub-element 529-C, and miscellaneous sub-element 529-D, In some embodiments, the lengths of sub-elements 529-A, 529-B, and 529-C relative to each other are based on the numbers of songs with song names in the respective language amongst content items 600. Thus, for example, the length of sub-element 529-C in FIG. 5K is significantly shorter than sub-element 529-A; there are significantly less songs with Chinese song names than songs with Japanese song names. In some embodiments, the lengths of sub-elements 529-A, 529-B, and 529-C relative to each other are based. on the numbers of songs with artist names in the respective language amongst content items 600. In some embodiments, the lengths of sub-elements 529-A, 529-B, and 529-C relative to each other are based on the number of artist names in the respective language amongst content items 600.

In some embodiments, if the ratio of the number of songs with Japanese song names (or artist names) to the number of songs with Chinese song names (or artist names) is greater than a predefined threshold, sub-element 529-C is displayed at a fixed length (e.g., a predefined default length). For example, In FIG. 5L, sub-element 529-C in UI 500L is displayed at a fixed length as long as the ratio is greater than the threshold.

In some embodiments, the disparity becomes so great that displaying sub-element 529-C does not benefit the user. For example, in UI 500M (FIG. 5M), sub-element 529-C is not displayed and Chinese artist names 524 are subsumed under miscellaneous sub-element 529-D, which, like miscellaneous sub-element 502-C, has a predefined length that is independent of the ratios of the numbers of songs having identifiers in particular languages.

FIG. 5N shows UI 500N, with a portion of song names listing 501. UI 500N includes character selection element 530A-collectively 530) (also referred to as index bar element 530), which is similar to index bar element 502, but horizontally oriented and displayed as a single row near (e.g., adjacent to) the lower horizontal edge of display 112.

The embodiments described above show the list of identifiers (e.g., song or artist name listings) displayed as left-justified on display 112. In some embodiments, the list of identifiers is displayed as right-justified, and the character selection element is displayed near (e.g., adjacent to) the left vertical edge of display 112, to accommodate identifiers written in languages that are written from right to left (e.g., Hebrew, Arabic).

It should be appreciated that while the embodiments described above describe listings of song names and artist names, the embodiments are applicable to listings of other identifiers as well, such as listings of album names, listings of show names, and so forth.

It should be appreciated that English is one of many languages written in the Latin alphabet. Other examples of languages written in the Latin alphabet include German, French, Spanish, Italian, etc. Identifiers written in any of these languages may be treated as identifiers written in different languages and ordered separately, or all grouped together as identifiers written in the Latin alphabet and ordered together.

FIG. 6 is a block diagram of a data structure for a content item database in accordance to some embodiments. One or more content items 600-1~600-M may be stored in memory 102 or 370. Each content item 600 includes the content itself 602. For example, if content item 600-2 is an audio file, then content 602 for content item 600-2 is the audio data in the audio file. Content item 600 may also include one or more metadata fields, some of which store identifier metadata that can be used to identify content item 600. For example, content item 600-2 includes name (e.g., song name 604, sort name 606, album 608, sort album 610, artist 612, and sort artist 614. It should be appreciated that this list of identifier metadata is merely exemplary. Content items may have more or less fields than listed. Further, a metadata field for a content item 600 may be empty.

In some embodiments, a content item 600 is displayed as having name 604, but is put into an ordering of a list of identifiers using sort name 606. In some embodiments, a content item 600 has name 604 written in one language and has sort name 606 that provides the phonetic spelling for name 604. For example, content item 600-2 may have name 604 written in Japanese kana and sort name 606 written as the romanization of name 604.

In some embodiments, whether content item 600 has a name 604 written in a particular language is determined at least in part based on the sort name 606. For example, if name 604 for content item 600-2 is written in kanji, and sort name 606 is written with the furigana for the kanji name 604, then name 604 is recognized as Japanese. If, instead, sort name 606 is empty, then name 604 is not recognized as Japanese and is instead categorized as miscellaneous.

It should be appreciated that similar relationships to those described above exists between album 608 and sort album 610, between artist 612 and sort artist 612, and the like.

FIG. 7 is a flow diagram illustrating a method 700 of navigating a list of identifiers in accordance with some embodiments. The method 700 is performed at an electronic device with a display and a touch-sensitive surface (e.g., device 300, FIG. 3A, device 300-1, FIG. 3B, or portable multifunction device 100, FIG. 1). In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to navigate a list of identifiers. The method reduces the cognitive burden on a user when navigating a list of identifiers, thereby creating a more efficient human-machine interface. For battery-operated electronic devices, enabling a user to navigate a list of identifiers faster and more efficiently conserves power and increases the time between battery charges.

The device displays on the display (702) a portion of a list of identifiers and a character selection element for navigating the list of identifiers. The list of identifiers is associated with a first number of first content items associated with a first language, and a second number of second content items, distinct from the first content items, associated with a second language distinct from the first language. In some embodiments, the identifiers in the list of identifiers are artists, albums, authors, composers, compilations, TV show or series names, or titles (e.g., song titles, song names, episode names, movie names) associated with the first content items (e.g., Japanese content) and artists, albums, authors, composers, compilations, or titles (e.g., song titles) associated with the second content items (e.g., English content). For example, in FIG. 5A, a portion of song names listing 501 is displayed. Song names listing 501 include Japanese song names 504, which are associated with a first number of content items 600 (e.g., Japanese songs), and English song names 506, which are associated with a second number of content items 600 (e.g., English songs). Index bar element 502 is also displayed. By performing gestures on index bar element 502, a user can select particular characters and quickly navigate to song names in song names listing 501 having the selected character as the leading character.

The character selection element represents a plurality of characters, and includes: a first character selection sub-element associated with the first content items and having a first size, and a second character selection sub-element associated with the second content items and having a second size, the first size relative to the second size being based on the first number relative to the second number. In other words, the size (e.g., length) of the first character selection sub-element relative to the size of the second character selection sub-element is based on the number of first content items relative to the number of second content items. For example, in FIG. 5A, the length of Japanese sub-element 502-A in index bar element 502 relative to the length of English sub-element 502-B is based on the number of content items associated with Japanese song names 504 relative to the number of content items associated with English song names 506.

Note that the character selection element is composed of at least two graphical elements, namely the first character selection sub-element and the second character selection sub-element. In turn, in some embodiments, a respective character selection sub-element is composed of additional graphical elements, such as one or more graphical elements that correspond to leading characters in the respective character selection sub-element or one or more graphical elements that indicate the stroke count in the respective character selection sub-element.

The device detects (704) an input (e.g. a finger contact or a finger tap gesture) at a location on the touch-sensitive surface that corresponds to a location on the first character selection sub-element on the display. For example, in FIG. 5C, gesture 512 is detected at a location corresponding to a location on Japanese sub-element 502-A.

In response to detecting the input at the location on the touch-sensitive surface that corresponds to the location on the first character selection sub-element on the display, the device displays (706) a portion of the list of identifiers with one or more identifiers associated with first content items (e.g., one or more artists, albums, authors, composers, compilations, or titles (e.g., song titles) associated with the first content items).

For example, in FIG. 5C, in response to detection of gesture 512, song names listing 501 skips to Japanese song names 504.

The device detects (708) an input at a location on the touch-sensitive surface that corresponds to a location on the second character selection sub-element on the display. For example, in FIG. 5D, gesture 514 is detected at a location corresponding to a location on English sub-element 502-B.

In response to detecting the input at the location on the touch-sensitive surface that corresponds to the location on the second character selection sub-element on the display, the device displays (710) a portion of the list of identifiers with one or more identifiers associated with second content items (e.g., one or more artists, albums, authors, composers, compilations, or titles (e.g., song titles) associated with the second content items). For example, in FIG. 5D in response to detection of gesture 514, song names listing 501 skips to English song names 506.

In some embodiments, the electronic device is a portable electronic device (e.g., a portable music player and/or a portable video player) (712). For example, device 300-1 is a portable electronic device that is used principally as a portable media player.

In some embodiments, the display is a touch-sensitive display that includes the touch-sensitive surface (714). For example, display 112 is a touch-screen.

In some embodiments, the touch-sensitive display has (716) physical dimensions of at least one of: 2 inches or less in width, and 2 inches or less in height.

In some embodiments, the touch-sensitive display has (718) a screen resolution of at least one of: 600 pixels or less in width, and 600 pixels or less in height.

In some embodiments, the character selection element is displayed at a first predefined location on the display, the first character selection sub-element includes locations corresponding to identifiers in the first language associated with the first content items, and the second character selection sub-element includes locations corresponding to identifiers in the second language associated with the second content items (720). For example, in FIG. 5A, index bar element 502 is displayed adjacent to the right vertical edge of display 112. Locations on Japanese sub-element 502-A correspond to Japanese song names 504, and locations on English sub-element 502-B correspond to English song names 506.

In some embodiments, the first character selection sub-element includes locations that correspond to leading characters of identifiers associated with the first content items. Note that most or all of the leading characters are typically not displayed at these locations due to display size constraints. For example, locations on Japanese sub-element 502-A correspond to leading kana characters in Japanese song names 504, beginning with "あ" and ending with "わ."

In some embodiments, the second character selection sub-element includes locations that correspond to leading characters of identifiers associated with the second content items. Note that most or all of the leading characters are typically not displayed at these locations due to display size constraints. For example, locations on English sub-element 502-B correspond to leading English letters in English song names 506, starting with "A" and ending with "Z."

In some embodiments, in response to detecting a point of contact at a location on the touch-sensitive surface that corresponds to a location on the first character selection sub-element on the display, the device displays (722) on the display at a predefined location distinct from the first predefined location a temporary character that represents a character in the identifiers associated with the first content items. For example, in FIG. 5E, in response to detection of gesture 516 on Japanese sub-element 502-A, temporary character 518-1 is displayed at a location distinct from index bar element 502. Temporary character "き" 518-1 represents a leading character in Japanese song names 504 (e.g., song name 504-6).

In some embodiments, the temporary character represents a leading character of an identifier associated with the first content items. For example, in FIG. 5E, temporary character "き" 518-1 represents a leading character in Japanese song name 504-6 ("き" being the hiragana equivalent of "キ"). In some embodiments, in response to detecting the point of contact at the location on the touch-sensitive surface that corresponds to the location on the first character selection sub-element on the display, the device updates the displayed portion of the list of identifiers to display a corresponding portion of the list with one or more identifiers associated with the first content items. For example, in response to detection of gesture 516, song names listing 501 skips to Japanese song names 504 with "き" or "キ" as the leading character (e.g. song name 504-6).

In some embodiments, the character selection element includes respective character elements that are displayed at a predefined respective character element size, the temporary character that represents a character in the identifiers associated with the first content items is displayed with a predefined temporary character size, and the predefined respective character element size is smaller than the predefined temporary character size (724). For example, in FIG. 5E, any characters actually displayed in index bar element 502 (e.g., "あ" and "わ" in Japanese sub-element 502-A) are displayed at a predefined size, and temporary character 518 is displayed at a predefined size that is larger than the predefined size of characters displayed in index bar element 502.

In some embodiments, in response to detecting a point of contact at a location on the touch-sensitive surface that corresponds to a location on the second character selection sub-element on the display, the device displays (726) on the display at a predefined location distinct from the first predefined location a temporary character that represents a character in the identifiers associated with the second content items. For example, in FIG. 5G, in response to detection of gesture 516 on English sub-element 502-B, temporary character 518-3 is displayed at a location distinct from index bar element 502. Temporary character "H" 518-3 represents a leading character in English song names 506 (e.g., song name 506-4).

In some embodiments, the temporary character represents a leading character of an identifier associated with the second content items. For example, temporary character "H" 518-3 represents a leading character in English song name 506-4. In some embodiments, in response to detecting the point of contact at the location on the touch-sensitive surface that corresponds to the location on the second character selection sub-element on the display, the device updates the displayed portion of the list of identifiers to display a corresponding portion of the list with one or more identifiers associated with the second content items. For example, in response to detection of gesture 516, song names listing 501 skips to English song names 506 with "H" as the leading character (e.g. song name 506-4).

In some embodiments, the list of identifiers are further associated with a third number of third content items associated with neither the first language nor the second language, and the character selection element includes a third character selection sub-element associated with the third content items and having a third size (728). For example, in FIG. 5K, artist names listing 527 includes Japanese artist names 508, English artist names 510, and Chinese artist names 524. Chinese artist names 524 are associated with content items 600 that have song names (or artist names) written in Chinese, and a number of such content items 600 are stored in memory 102 or 370. Index bar element 529 includes Japanese sub-element 529-A, English sub-element 529-B, and Chinese sub-element 529-C, with Chinese sub-element 529-C being associated with Chinese songs and displayed at a certain size.

As another example, in FIG. 5A, song name listing 501 may include one or more song names that are not written in Japanese or English (not shown). Index bar element 502 includes miscellaneous sub-element 502-C that is associated with these song names, and miscellaneous sub-element 502-C is displayed at a certain size.

In some embodiments, the third content items are associated with a third language distinct from the first language and the second language, and the third size relative to the first size is based on the third number relative to the first number (730). In other words, the size (e.g., length) of the third character selection sub-element relative to the size of the first character selection sub-element is based on the number of third content items relative to the number of first content items. For example, in FIG. 5K, the content items 600 associated with Chinese artist names 524 may be Chinese songs, and the size of Chinese sub-element 529-C is based on the number of Chinese songs relative to the number of Japanese songs. Similarly, the size (e.g., length) of the third character selection sub-element relative to the size of the second character selection sub-element may be based on the number of third content items relative to the number of second content items.

In some embodiments, the third content items are associated with a third language distinct from the first language and the second language, the third size relative to the first size is based on the third number relative to the first number when the third number relative to the first number exceeds a predefined threshold, and the third size is independent of the third number relative to the first number when the third number relative to the first number does not exceed the predefined threshold (732). In other words, in some embodiments, the size (e.g., length) of the third character selection sub-element relative to the size of the first character selection sub-element is based on the number of third content items relative to the number of first content items when the number of third content items relative to the number of first content items exceeds a predefined threshold. But, when the number of third content items relative to the number first content items is below the predefined threshold, the size of the third character selection sub-element is displayed at a size (e.g., a default length) that is independent of the number of third content items relative to the number of first content items. In some embodiments, the predefined threshold for proportionally scaling the size of the third character selection sub-element is based on the number of third content items relative to the number of second content items. In some embodiments, the predefined threshold for proportionally scaling the size of the third character selection sub-element is based on the number of third content items relative to the total number of first content items and second content items. In some embodiments, the predefined threshold for proportionally scaling the size of the third character selection sub-element is based on the number of third content items relative to the number of other content items in the list. In some embodiments, the predefined threshold for proportionally scaling the size of the third character selection sub-element is based on the number of third content items relative to the total number of content items in the list. These bases for proportionally scaling respective character selection sub-elements are essentially equivalent to one another.

For example, in FIG. 5K, content items 600 associated with Chinese artist names 524 may be Chinese songs, and the size of Chinese sub-element 529-C is based on the number of Chinese songs relative to the number of Japanese songs. When the ratio of the number of Chinese songs to the number of Japanese songs exceeds a predefined threshold, Chinese sub-element 529-C is displayed at a certain length based on the ratio, as in FIG. 5K. When the ratio of the number of Chinese songs to the number of Japanese songs does not exceed the threshold, Chinese sub-element 529-C is displayed at a fixed length, as in FIG. 5L.

In some embodiments, the character selection element is displayed at a first predefined location on the display, the first character selection sub-element includes locations corresponding to identifiers in the first language associated with the first content items, and the second character selection sub-element includes locations corresponding to identifiers in the second language associated with the second content items (734). For example, in FIG. 5A, index bar element 502 is displayed adjacent to the right vertical edge of display 112. Locations on Japanese sub-element 502-A correspond to Japanese song names 504, and locations on English sub-element 502-B correspond to English song names 506.

In some embodiments, the first character selection sub-element includes locations that correspond to leading characters of identifiers associated with the first content items. Note that most or all of the leading characters are typically not displayed at these locations due to display size constraints. For example, locations on Japanese sub-element 502-A correspond to leading kana characters in Japanese song names 504, beginning with "あ" and ending with "わ."

In some embodiments, the second character selection sub-element includes locations that correspond to leading characters of identifiers associated with the second content items. Note that most or all of the leading characters are typically not displayed at these locations due to display size constraints. For example, locations on English sub-element 502-B correspond to leading English letters in English song names 506, starting with "A" and ending with "Z."

In some embodiments, in response to detecting movement of a point of contact over locations on the touch-sensitive surface that corresponds to locations on the first character selection sub-element on the display (736): the device updates (738) a temporary character displayed at a predefined location distinct from the first predefined location, the temporary character representing a character in the identifiers associated with the first content items, and updates (740) a displayed portion of the list of identifiers with one or more corresponding identifiers associated with the first content items. In some embodiments, the temporary character represents a leading character of an identifier associated with the first content items. For example, in FIGS. 5E-5F, in response to detection of movement 517 of a point of contact in gesture 516 on Japanese sub-element 502-A, temporary character 518-1, displayed at a location distinct from index bar element 502, is updated to temporary character 518-2. Temporary characters "き" 518-1 and "と" 518-2 represent leading characters in Japanese song names 504 (e.g., song names 504-6, 504-1). Song names listing 501 skips to different song names (e.g., from song name 504-6 to song name 504-1) in accordance with movement 517 of a point of contact in gesture 516.

In some embodiments, in response to detecting movement of the point of contact over locations on the touch-sensitive surface that corresponds to locations on the second character selection sub-element on the display (742): the device updates (744) a temporary character displayed at a predefined location distinct from the first predefined location, the temporary character representing a character in the identifiers associated with the second content items; and updates (746) a displayed portion of the list of identifiers with one or more corresponding identifiers associated with the second content items. In some embodiments, the temporary character represents a leading character of an identifier associated with the second content items. For example, in FIGS. 5G-5H, in response to detection of movement 517 of a point of contact in gesture 516 on English sub-element 502-B, temporary character 518-3, displayed at a location distinct from index bar element 502, is updated to temporary character 518-4. Temporary characters "H" 518-3 and "L" 518-4 represent leading characters in English song names 506 (e.g., song names 506-4, 504-1). Song names listing 501 skips to different song names (e.g., from song name 506-4 to song name 506-5) in accordance with movement 517 of a point of contact in gesture 516.

In some embodiments, the first character selection sub-element includes one or more graphical elements corresponding to a first indexing scheme associated with the first language, and the second character selection sub-element includes one or more graphical elements corresponding to a second indexing scheme associated with the second language (748). For example, in FIG. 5A, Japanese sub-element 502-A includes character "あ" at the beginning and character "わ" at the end, representing the beginning and end of gojūon ordering for kana; Japanese sub-element 502-A indexes Japanese song names 504 by the leading kana character, ordered in gojūon order. English sub-element 502-B includes character "A" at the beginning and character "Z" at the end, representing the beginning and end of alphabetical ordering for English letters; English sub-element 502-B indexes English song names 506 by the leading letter, ordered in alphabetical order.

In some embodiments, the first language is Chinese, and the first indexing scheme is based on character stroke count (750). For example, in FIG. 5I, Chinese song names 520 are ordered by the stroke count of the leading character. Chinese sub-element 521-A indexes Chinese song names 520 according to that stroke count. In some embodiments, the second language is English, and the second indexing scheme is based on an alphabet (752). For example, in FIG. 5I, English song names 506 are ordered alphabetically. English sub-element 521-B indexes English song names 506 by the leading alphabet letter, in alphabetical order.

In some embodiments, the first language is Japanese, and the first indexing scheme is based on kana script (754). For example, in FIG. 5A, Japanese song names 504 are ordered in gojūon order based on the leading kana character. Japanese sub-element 502-A indexes Japanese song names 504 according to the leading kana character, in gojūon order. In some embodiments, the second language is English, and the second indexing scheme is based on an alphabet (756). For example, in FIG. 5A, English song names 506 are ordered alphabetically. English sub-element 502-B indexes English song names 506 by the leading alphabet letter, in alphabetical order.

In some embodiments, the first language is Korean, and the first indexing scheme is based on Hangul spelling (758). For example, in FIG. 5J, Korean artist names 522 are ordered in Hangul alphabetical order. Korean sub-element 525-A indexes Korean artist names 522 according to the leading Hangul character, in Hangul alphabetical order. In some embodiments, the second language is English, and the second indexing scheme is based on an alphabet (760). For example, in FIG. 5J, English artist names 510 are ordered alphabetically. English sub-element 525-B indexes English artist names 510 by the leading alphabet letter, in alphabetical order.

In some embodiments, graphical elements in the first character selection sub-element and graphical elements in the second character selection sub-element are located adjacent to an edge of the display (762). For example, in FIG. 5A, index bar element 502, including sub-elements 502-A and 502-B, is displayed adjacent to the right vertical edge of display 112.

In some embodiments, graphical elements in the first character selection sub-element and graphical elements in the second character selection sub-element are part of a single row of graphical elements in the character selection element (764). For example, in FIG. 5N, index bar element 530, including sub-elements 530-A and 530-B, is displayed as a single row.

In some embodiments, graphical elements in the first character selection sub-element and graphical elements in the second character selection sub-element are part of a single column of graphical elements in the character selection element (766). For example, in FIG. 5A, index bar element 502, including sub-elements 502-A and 502-B, is displayed as a single column.

Figure 8:
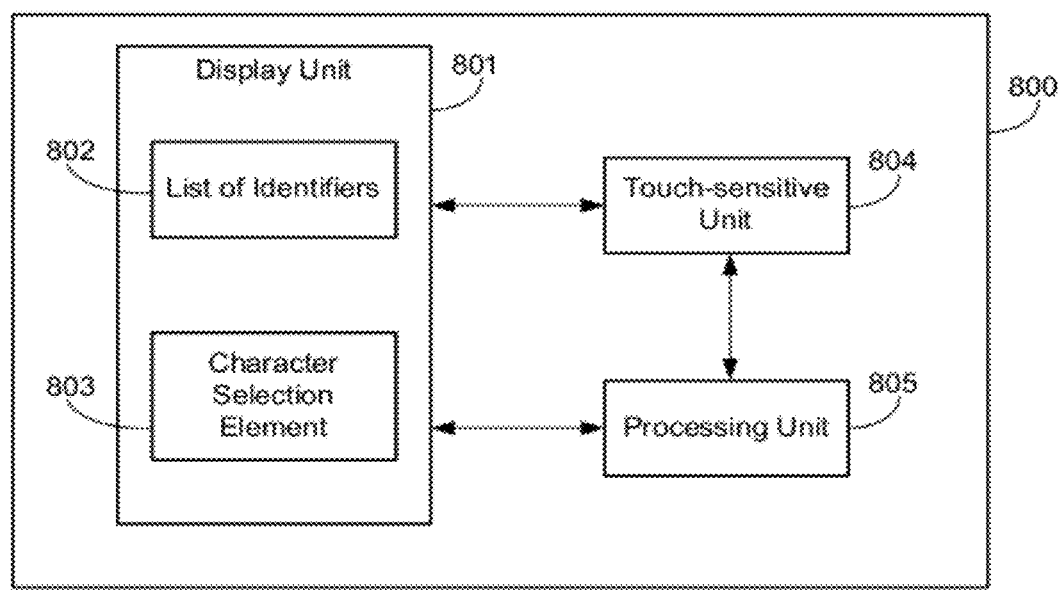
FIG. 8 is a functional block diagram of an electronic device in accordance with some embodiments.

According to some embodiments, FIG. 8 shows a functional block diagram of an electronic device 800 configured in accordance with the principles of the invention as described above. The electronic device may be implemented by hardware, software, or a combination of hardware and software to carry out the principles of the invention.

As shown in FIG. 8, a display unit 801 displays a portion of a list of identifiers 802 and a character selection element 803 for navigating the list of identifiers. The list of identifiers 802 is associated with a first number of first content items associated with a first language, and a second number of second content items, distinct from the first content items, associated with a second language distinct from the first language. The character selection element 803 represents a plurality of characters, and includes a first character selection sub-element associated with the first content items and having a first size, and a second character selection sub-element associated with the second content items and having a second size, the first size relative to the second size being based on the first number relative to the second number. A touch-sensitive unit 804 receives a user input. A processing unit 805 is coupled to the display unit 801 and the touch-sensitive unit 804. In response to detecting an input at a location on the touch-sensitive unit 804 that corresponds to a location on the first character selection sub-element on the display unit 801, the processing unit 805 displays on the display unit 801 a portion of the list of identifiers 802 with one or more identifiers associated with first content items (as shown in FIG. 5C, for example). In response to detecting an input at a location on the touch-sensitive unit 804 that corresponds to a location on the second character selection sub-element on the display unit 801, the processing unit 805 displays on the display unit 801 a portion of the list of identifiers 802 with one or more identifiers associated with second content items (as shown in FIG. 5D, for example).

In some embodiments, the character selection element 803 is displayed at a first predefined location on the display unit 801, the first character selection sub-element includes locations corresponding to identifiers in the first language associated with the first content items, and the second character selection sub-element includes locations corresponding to identifiers in the second language associated with the second content items. In response to detecting a point of contact at a location on the touch-sensitive unit 804 that corresponds to a location on the first character selection sub-element on the display unit 801, the processing unit 801 at a predefined location distinct from the first predefined location a temporary character that represents a character in the identifiers associated with the first content items (as shown in FIG. 5E, for example). In response to detecting a point of contact at a location on the touch-sensitive unit 804 that corresponds to a location on the second character selection sub-element on the display unit 801, the processing unit 805 displays on the display unit 801 at a predefined location distinct from the first predefined location a temporary character that represents a character in the identifiers associated with the second content items (as shown in FIG. 5G, for example).

In some embodiments, the character selection element 803 includes respective character elements that are displayed at a predefined respective character element size, the temporary character that represents a character in the identifiers associated with the first content items is displayed with a predefined temporary character size, and the predefined respective character element size is smaller than the predefined temporary character size (as shown in FIG. 5E, for example).

In some embodiments, the character selection element 803 is displayed at a first predefined location on the display unit 801, the first character selection sub-element includes locations corresponding to identifiers in the first language associated with the first content items, and the second character selection sub-element includes locations corresponding to identifiers in the second language associated with the second content items. In response to detecting movement of a point of contact over locations on the touch-sensitive unit 804 that corresponds to locations on the first character selection sub-element on the display unit 801, the processing unit 805 updates on the display unit 801 a temporary character displayed at a predefined location distinct from the first predefined location, the temporary character representing a character in the identifiers associated with the first content items (as shown in FIG. 5F, for example), and the processing unit 805 updates on the display unit 801 a displayed portion of the list of identifiers 802 with one or more corresponding identifiers associated with the first content items (as shown in FIG. 5F, for example). In response to detecting movement of the point of contact over locations on the touch-sensitive unit 804 that corresponds to locations on the second character selection sub-element on the display unit 801, the processing unit 805 updates on the display unit 801 a temporary character displayed at a predefined location distinct from the first predefined location, the temporary character representing a character in the identifiers associated with the second content items (as shown in FIG. 5H, for example), and the processing unit 805 updates on the display unit 801 a displayed portion of the list of identifiers 802 with one or more corresponding identifiers associated with the second content items (as shown in FIG. 5H, for example).

In some embodiments, the first character selection sub-element includes one or more graphical elements corresponding to a first indexing scheme associated with the first language, and the second character selection sub element includes one or more graphical elements corresponding to a second indexing scheme associated with the second language (as shown in FIG. 5A, for example).

In some embodiments, the first language is Chinese, and the first indexing scheme is based on character stroke count (as shown in FIG. 5I, for example). In some embodiments, the second language is English, and the second indexing scheme is based on an alphabet (as shown in FIG. 5I, for example).

In some embodiments, the first language is Japanese, and the first indexing scheme is based on kana script (as shown in FIG. 5A, for example). In some embodiments, the second language is English, and the second indexing scheme is based on an alphabet (as shown in FIG. 5A, for example).

In some embodiments, the first language is Korean, and the first indexing scheme is based on Hangul spelling (as shown in FIG. 5J, for example). In some embodiments, the second language is English, and the second indexing scheme is based on an alphabet (as shown in FIG. 5J, for example).

In some embodiments, the list of identifiers 802 are further associated with a third number of third content items associated with neither the first language nor the second language, and the character selection element 803 includes a third character selection sub-element associated with the third content items and having a third size (as shown in FIG. 5K, for example).

In some embodiments, the third content items are associated with a third language distinct from the first language and the second language, and the third size relative to the first size is based on the third number relative to the first number (as shown in FIG. 5K, for example).

Figure 5L:
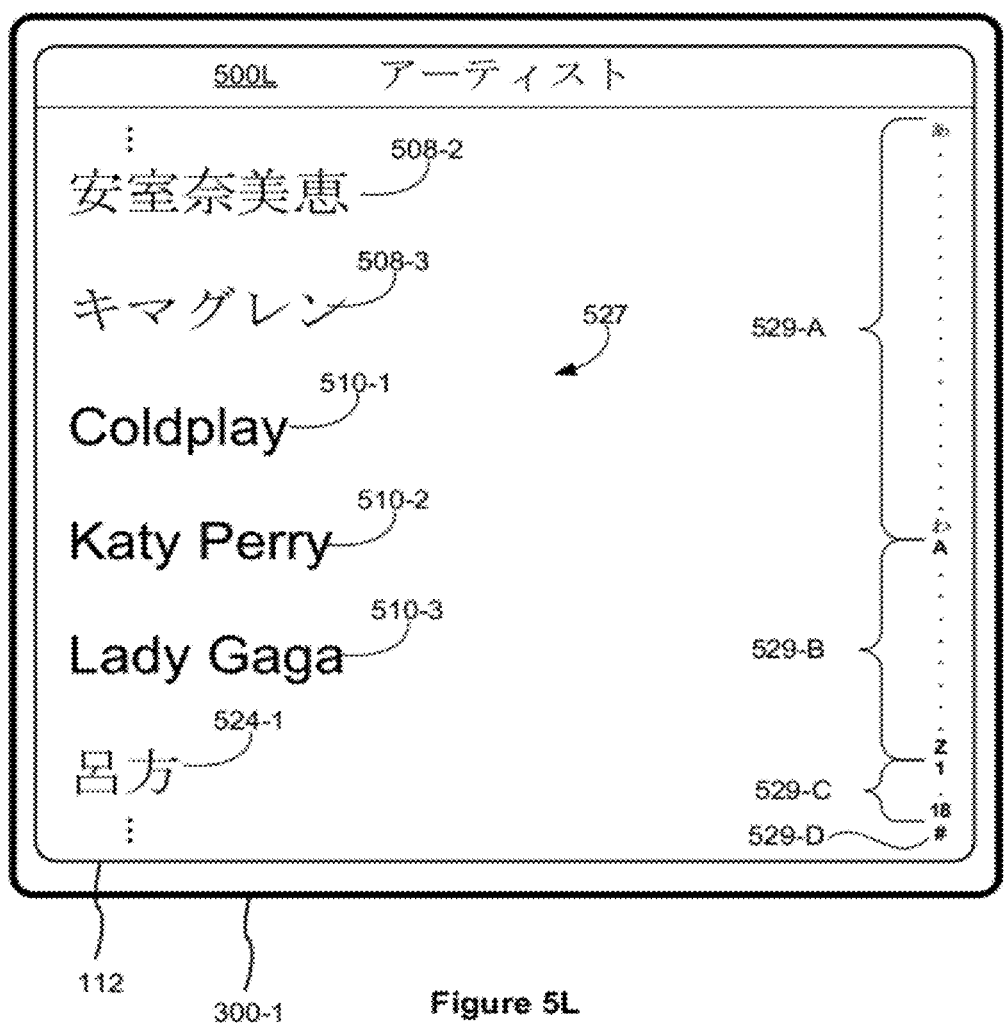
Figure 5M:
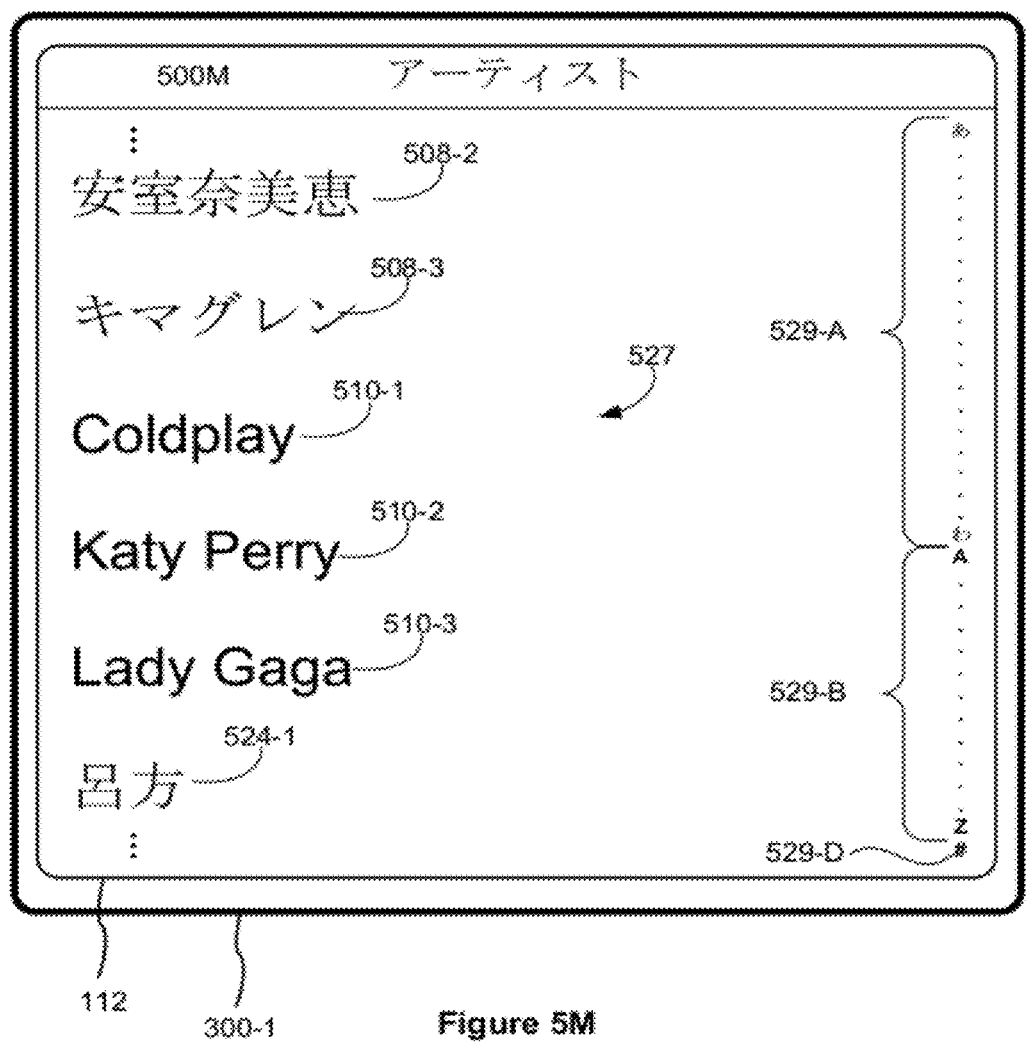

In some embodiments, the third content items are associated with a third language distinct from the first language and the second language. The third size relative to the first size is based on the third number relative to the first number when the third number relative to the first number exceeds a predefined threshold (as shown in FIG. 5K, for example), and the third size is independent of the third number relative to the first number when the third number relative to the first number does not exceed the predefined threshold (as shown in FIG. 5L, for example).

In some embodiments, graphical elements in the first character selection sub-element and graphical elements in the second character selection sub-element are located adjacent to an edge of the display unit (as shown in FIG. 5A, for example).

In some embodiments, graphical elements in the first character selection sub-element and graphical elements in the second character selection sub-element are part of a single row of graphical elements in the character selection element (as shown in FIG. 5N, for example).

In some embodiments, graphical elements in the first character selection sub-element and graphical elements in the second character selection sub-element are part of a single column of graphical elements in the character selection element (as shown in FIG. 5A, for example).

In some embodiments, the electronic device 800 is a portable electronic device (as shown in FIG. 5A, for example).

In some embodiments, the display unit 801 is a touch-sensitive display unit that includes a touch-sensitive surface, such as touch-sensitive unit 804 (as shown in FIG. 5A, for example).

In some embodiments, the touch-sensitive display unit 801 has physical dimensions of at least one of: 2 inches or less in width, and 2 inches or less in height (as shown in FIG. 5A, for example).

In some embodiments, the touch-sensitive display unit 801 has a screen resolution of at least one of: 600 pixels or less in width, and 600 pixels or less in height (as shown in FIG. 5A, for example).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3A) are all included within the scope of protection of the invention.

The operations described above with reference to FIGS. 7A-7D may be implemented by components depicted in FIGS. 1A-1B. For example, detection operations 704, 708 and displaying operations 706, 710 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
   displaying on the display:
   a portion of a list of identifiers, the list of identifiers associated with:
   a first number of first content items associated with a first language, and
   a second number of second content items, distinct from the first content items, associated with a second language distinct from the first language; and,
   a character selection element for navigating the list of identifiers, the character selection element representing a plurality of characters, the character selection element including:
   a first character selection sub-element associated with the first content items and having a first size, and
   a second character selection sub-element associated with the second content items and having a second size, the first size relative to the second size being determined based on the first number relative to the second number;

detecting an input at a location on the touch-sensitive surface that corresponds to a location on the first character selection sub-element on the display;

in response to detecting the input at the location on the touch-sensitive surface that corresponds to the location on the first character selection sub-element on the display, displaying a portion of the list of identifiers with one or more identifiers associated with first content items;

detecting an input at a location on the touch-sensitive surface that corresponds to a location on the second character selection sub-element on the display; and, in response to detecting the input at the location on the touch-sensitive surface that corresponds to the location on the second character selection sub-element on the display, displaying a portion of the list of identifiers with one or more identifiers associated with second content items.

2. The device of claim 1, wherein:

the character selection element is displayed at a first predefined location on the display, the first character selection sub-element includes locations corresponding to identifiers in the first language associated with the first content items, and the second character selection sub-element includes locations corresponding to identifiers in the second language associated with the second content items;

the device including instructions for:

in response to detecting a point of contact at a location on the touch-sensitive surface that corresponds to a location on the first character selection sub-element on the display, displaying on the display at a predefined location distinct from the first predefined location a temporary character that represents a character in the identifiers associated with the first content items; and, in response to detecting a point of contact at a location on the touch-sensitive surface that corresponds to a location on the second character selection sub-element on the display, displaying on the display at a predefined location distinct from the first predefined location a temporary character that represents a character in the identifiers associated with the second content items.

3. The device of claim 1, wherein:

the character selection element includes respective character elements that are displayed at a predefined respective character element size;

a temporary character that represents a character in the identifiers associated with the first content items is displayed with a predefined temporary character size; and, the predefined respective character element size is smaller than the predefined temporary character size.

4. The device of claim 1, wherein:

the character selection element is displayed at a first predefined location on the display, the first character selection sub-element includes locations corresponding to identifiers in the first language associated with the first content items, and the second character selection sub-element includes locations corresponding to identifiers in the second language associated with the second content items;

the device including instructions for:

in response to detecting movement of a point of contact over locations on the touch-sensitive surface that corresponds to locations on the first character selection sub-element on the display:

updating a temporary character displayed at a predefined location distinct from the first predefined location, the temporary character representing a character in the identifiers associated with the first content items; and updating a displayed portion of the list of identifiers with one or more corresponding identifiers associated with the first content items; and, in response to detecting movement of the point of contact over locations on the touch-sensitive surface that corresponds to locations on the second character selection sub-element on the display:

updating a temporary character displayed at a predefined location distinct from the first predefined location, the temporary character representing a character in the identifiers associated with the second content items; and updating a displayed portion of the list of identifiers with one or more corresponding identifiers associated with the second content items.

5. The device of claim 1, wherein the first character selection sub-element includes one or more graphical elements corresponding to a first indexing scheme associated with the first language, and the second character selection sub-element includes one or more graphical elements corresponding to a second indexing scheme associated with the second language.

6. The device of claim 5, wherein the first language is Chinese, and the first indexing scheme is based on character stroke count.

7. The device of claim 6, wherein the second language is English, and the second indexing scheme is based on an alphabet.

8. The device of claim 5, wherein the first language is Japanese, and the first indexing scheme is based on kana script.

9. The device of claim 8, wherein the second language is English, and the second indexing scheme is based on an alphabet.

10. The device of claim 5, wherein the first language is Korean, and the first indexing scheme is based on Hangul spelling.

11. The device of claim 10, wherein the second language is English, and the second indexing scheme is based on an alphabet.

12. The device of claim 1, wherein the list of identifiers are further associated with a third number of third content items associated with neither the first language nor the second language, and the character selection element includes a third character selection sub-element associated with the third content items and having a third size.

13. The device of claim 12, wherein the third content items are associated with a third language distinct from the first language and the second language, and the third size relative to the first size is based on the third number relative to the first number.

14. The device of claim 12, wherein the third content items are associated with a third language distinct from the first language and the second language;

the third size relative to the first size is based on the third number relative to the first number when the third number relative to the first number exceeds a predefined threshold; and the third size is independent of the third number relative to the first number when the third number relative to the first number does not exceed the predefined threshold.

15. The device of claim 1, wherein graphical elements in the first character selection sub-element and graphical elements in the second character selection sub-element are located adjacent to an edge of the display.

16. The device of claim 1, wherein graphical elements in the first character selection sub-element and graphical elements in the second character selection sub-element are part of a single row of graphical elements in the character selection element.

17. The device of claim 1, wherein graphical elements in the first character selection sub-element and graphical elements in the second character selection sub-element are part of a single column of graphical elements in the character selection element.

18. The device of claim 1, wherein the electronic device is a portable electronic device.

19. The device of claim 1, wherein the display is a touch-sensitive display that includes the touch-sensitive surface.

20. The device of claim 19, wherein the touch-sensitive display has physical dimensions of at least one of: 2 inches or less in width, and 2 inches or less in height.

21. The device of claim 19, wherein the touch-sensitive display has a screen resolution of at least one of: 600 pixels or less in width, and 600 pixels or less in height.

22. A method, comprising:
at an electronic device with a display and a touch-sensitive surface:
displaying on the display:
a portion of a list of identifiers, the list of identifiers associated with:
a first number of first content items associated with a first language, and
a second number of second content items, distinct from the first content items, associated with a second language distinct from the first language; and,
a character selection element for navigating the list of identifiers, the character selection element representing a plurality of characters, the character selection element including:
a first character selection sub-element associated with the first content items and having a first size, and
a second character selection sub-element associated with the second content items and having a second size, the first size relative to the second size being determined based on the first number relative to the second number;
detecting an input at a location on the touch-sensitive surface that corresponds to a location on the first character selection sub-element on the display;
in response to detecting the input at the location on the touch-sensitive surface that corresponds to the location on the first character selection sub-element on the display, displaying a portion of the list of identifiers with one or more identifiers associated with first content items;
detecting an input at a location on the touch-sensitive surface that corresponds to a location on the second character selection sub-element on the display; and,
in response to detecting the input at the location on the touch-sensitive surface that corresponds to the location on the second character selection sub-element on the display, displaying a portion of the list of identifiers with one or more identifiers associated with second content items.

23. A graphical user interface on an electronic device with a display, a touch-sensitive surface, a memory, and one or more processors to execute one or more programs stored in the memory, the graphical user interface comprising:
a portion of a list of identifiers, the list of identifiers associated with:
a first number of first content items associated with a first language, and
a second number of second content items, distinct from the first content items, associated with a second language distinct from the first language; and,
a character selection element for navigating the list of identifiers, the character selection element representing a plurality of characters, the character selection element including:
a first character selection sub-element associated with the first content items and having a first size, and
a second character selection sub-element associated with the second content items and having a second size, the first size relative to the second size being determined based on the first number relative to the second number;
wherein:
an input is detected at a location on the touch-sensitive surface that corresponds to a location on the first character selection sub-element on the display;
in response to detecting the input at the location on the touch-sensitive surface that corresponds to the location on the first character selection sub-element on the display, a portion of the list of identifiers with one or more identifiers associated with first content items is displayed;
an input is detected at a location on the touch-sensitive surface that corresponds to a location on the second character selection sub-element on the display; and,
in response to detecting the input at the location on the touch-sensitive surface that corresponds to the location on the second character selection sub-element on the display, a portion of the list of identifiers with one or more identifiers associated with second content items is displayed.

24. A non-transitory computer readable storage medium storing one or more programs, the one or more programs comprising instructions, which when executed by an electronic device with a display and a touch-sensitive surface, cause the device to:
display on the display:
a portion of a list of identifiers, the list of identifiers associated with:
a first number of first content items associated with a first language, and
a second number of second content items, distinct from the first content items, associated with a second language distinct from the first language; and,
a character selection element for navigating the list of identifiers, the character selection element representing a plurality of characters, the character selection element including:
a first character selection sub-element associated with the first content items and having a first size, and
a second character selection sub-element associated with the second content items and having a second size, the first size relative to the second size being determined based on the first number relative to the second number;

detect an input at a location on the touch-sensitive surface that corresponds to a location on the first character selection sub-element on the display;

in response to detecting the input at the location on the touch-sensitive surface that corresponds to the location on the first character selection sub-element on the display, display a portion of the list of identifiers with one or more identifiers associated with first content items;

detect an input at a location on the touch-sensitive surface that corresponds to a location on the second character selection sub-element on the display; and, in response to detecting the input at the location on the touch-sensitive surface that corresponds to the location on the second character selection sub-element on the display, display a portion of the list of identifiers with one or more identifiers associated with second content items.

\* \* \* \* \*